(12) United States Patent
Kosmoski et al.

(10) Patent No.: US 9,493,881 B2
(45) Date of Patent: Nov. 15, 2016

(54) SULFATE-BASED ELECTROLYSIS PROCESSING WITH FLEXIBLE FEED CONTROL, AND USE TO CAPTURE CARBON DIOXIDE

(75) Inventors: Joseph Victor Kosmoski, Lafayette, CO (US); C. Deane Little, Niwot, CO (US);

(Continued)

(73) Assignee: New Sky Energy, Inc., Boulder, CO (US)

(*) Notice: Subject to any disclaimer, the term of this patent is extended or adjusted under 35 U.S.C. 154(b) by 106 days.

(21) Appl. No.: 14/006,289

(22) PCT Filed: Mar. 23, 2012

(86) PCT No.: PCT/US2012/030381
§ 371 (c)(1),
(2), (4) Date: Sep. 19, 2013

(87) PCT Pub. No.: WO2012/129510
PCT Pub. Date: Sep. 27, 2012

(65) Prior Publication Data
US 2014/0010743 A1  Jan. 9, 2014

Related U.S. Application Data

(60) Provisional application No. 61/465,736, filed on Mar. 24, 2011.

(51) Int. Cl.
C25B 1/14  (2006.01)
C25B 1/16  (2006.01)
(Continued)

(52) U.S. Cl.
CPC .............. *C25B 1/14* (2013.01); *C01F 11/181* (2013.01); *C25B 1/16* (2013.01); *B01D 53/62* (2013.01);
(Continued)

(58) Field of Classification Search
None
See application file for complete search history.

(56) References Cited

U.S. PATENT DOCUMENTS 1,500,126 A    7/1924  Hanson et al.
2,468,803 A *  5/1949  Bonnet .................... C01D 5/16
                                                    423/184
(Continued)

FOREIGN PATENT DOCUMENTS

WO    2004022480 A2    3/2004
WO    2005005981 A2    1/2005
WO    2008151060 A1    12/2008

OTHER PUBLICATIONS

Rodriguez-Navarro et al, How does sodium sulfate crystalize? Implications for the decay and testing of building materials, Cement and Concrete Research, vol. 30, Issue 10, Oct. 2000, pp. 1527-1534.*

(Continued)

*Primary Examiner* — Harry D Wilkins, III
(74) *Attorney, Agent, or Firm* — Marsh Fischmann & Breyfogle LLP; Ross E. Breyfogle

(57) ABSTRACT

A method including electrolysis processing using sulfate-based electrolytes includes precipitating sodium sulfate decahydrate from a salt solution and then redissolving sodium sulfate decahydrate to prepare feed of electrolyte solution for the electrolysis processing. Front-end processing may be used to treat mixed salt solutions, including brine solutions. Calcium sulfate reagent may provide a sulfate source to regenerate electrolyte solution following carbon capture, and with carbon dioxide being sequestered in the form of calcium carbonate.

24 Claims, 21 Drawing Sheets

(75) Inventors: Nabilah Rontu Carlon, Broomfield, CO (US)

(51) Int. Cl.
*C01D 5/00* (2006.01)
*C01F 11/18* (2006.01)
*B01D 53/62* (2006.01)

(52) U.S. Cl.
CPC ... *B01D 2251/404* (2013.01); *B01D 2251/604* (2013.01); *B01D 2257/504* (2013.01); *C01D 5/00* (2013.01); *Y02P 20/152* (2015.11)

(56) References Cited

U.S. PATENT DOCUMENTS

| | | | |
|---|---|---|---|
| 2,829,095 A | 4/1958 | Oda et al. | |
| 3,019,183 A | 1/1962 | Gomella | |
| 3,202,477 A | 8/1965 | Loeffler, Jr. et al. | |
| 3,222,267 A | 12/1965 | Tirrell et al. | |
| 3,322,574 A | 5/1967 | Justi et al. | |
| 3,394,050 A | 7/1968 | Miller | |
| 3,471,384 A | 10/1969 | Albertson | |
| 3,661,762 A | 5/1972 | Parsi | |
| 3,873,672 A | 3/1975 | Nishiba et al. | |
| 3,944,474 A | 3/1976 | Verlaeten | |
| 3,998,709 A * | 12/1976 | Winkler | C25B 15/08 205/510 |
| 4,197,421 A | 4/1980 | Steinberg | |
| 4,215,182 A | 7/1980 | Ang et al. | |
| 4,290,864 A | 9/1981 | Shuster et al. | |
| 4,312,720 A | 1/1982 | Lefevre | |
| 4,530,745 A | 7/1985 | Komatsu et al. | |
| 4,609,441 A | 9/1986 | Frese, Jr. et al. | |
| 4,663,004 A | 5/1987 | Switzer | |
| 4,680,095 A | 7/1987 | Wheaton | |
| 4,802,960 A | 2/1989 | Eisman et al. | |
| 5,141,604 A | 8/1992 | Ayers | |
| 5,176,801 A | 1/1993 | Szanto et al. | |
| 5,230,779 A | 7/1993 | Martin | |
| 5,423,959 A * | 6/1995 | Sundblad | C25B 1/22 205/510 |
| 5,425,863 A | 6/1995 | Chiti | |
| 5,543,034 A | 8/1996 | Hilbertz et al. | |
| 5,565,182 A * | 10/1996 | Sokol | C01B 11/026 205/510 |
| 5,599,438 A | 2/1997 | Shiramizu et al. | |
| 5,614,078 A | 3/1997 | Lubin et al. | |
| 5,928,488 A | 7/1999 | Newman | |
| 5,958,208 A | 9/1999 | Thiele et al. | |
| 6,294,066 B1 | 9/2001 | Mani | |
| 6,319,391 B1 | 11/2001 | Holderness et al. | |
| 6,387,238 B1 | 5/2002 | Merk et al. | |
| 6,576,362 B2 | 6/2003 | Hanlon | |
| 6,652,719 B1 | 11/2003 | Tseng | |
| 6,846,584 B2 | 1/2005 | Dutil et al. | |
| 6,855,450 B2 | 2/2005 | Molter et al. | |
| 6,887,601 B2 | 5/2005 | Moulthrop, Jr. et al. | |
| 6,890,497 B2 | 5/2005 | Rau et al. | |
| 7,020,562 B2 | 3/2006 | Lillis et al. | |
| 7,153,409 B2 | 12/2006 | Shiepe et al. | |
| 7,635,531 B1 | 12/2009 | Carreiro et al. | |
| 2002/0025449 A1 | 2/2002 | Sukamto et al. | |
| 2002/0025457 A1 | 2/2002 | Dodd et al. | |
| 2002/0056635 A1 | 5/2002 | Bentley | |
| 2002/0106540 A1 | 8/2002 | Shioya | |
| 2002/0148574 A1 | 10/2002 | Van Draanen et al. | |
| 2002/0197727 A1 | 12/2002 | Srinivasan et al. | |
| 2003/0231700 A1 | 12/2003 | Alamouti et al. | |
| 2004/0013918 A1 | 1/2004 | Merida-Donis | |
| 2004/0084795 A1 | 5/2004 | Hornsby et al. | |
| 2004/0222542 A1 | 11/2004 | Jan et al. | |
| 2005/0002847 A1 | 1/2005 | Maroto-Valer et al. | |
| 2005/0011770 A1 | 1/2005 | Katsuyoshi et al. | |
| 2005/0013750 A1 | 1/2005 | Monzyk et al. | |
| 2005/0098443 A1 | 5/2005 | Gomez | |
| 2005/0161342 A1 | 7/2005 | Carson et al. | |
| 2005/0183962 A1 | 8/2005 | Oakes | |
| 2005/0194041 A1 | 9/2005 | Fan et al. | |
| 2005/0269210 A1 | 12/2005 | Klein | |
| 2006/0185985 A1 | 8/2006 | Jones | |
| 2006/0235091 A1 | 10/2006 | Olah et al. | |
| 2007/0045125 A1 | 3/2007 | Hartvigsen et al. | |
| 2007/0187247 A1 | 8/2007 | Lackner et al. | |
| 2007/0217981 A1 | 9/2007 | Van Essendelft | |
| 2008/0245660 A1 | 10/2008 | Little et al. | |
| 2008/0245672 A1 | 10/2008 | Little et al. | |
| 2008/0248350 A1 | 10/2008 | Little et al. | |
| 2009/0081096 A1 | 3/2009 | Pellegrin | |
| 2009/0123751 A1 | 5/2009 | Horiguchi et al. | |
| 2010/0051859 A1 | 3/2010 | House et al. | |
| 2010/0135865 A1 | 6/2010 | Constantz et al. | |

OTHER PUBLICATIONS

Fernandez-Diaz et al, The Carbonation of Gypsum: Pathways and Pseudomorph Formation, American Mineralogist, vol. 94, No. 8-9, Aug. 2009, pp. 1223-1234.*
Marliacy et al, Thermodynamics of crystallization of sodium sulfate decahydrate in H2O—NaCl—Na2SO4: application to Na2SO4—10H2O-based latent heat storage materials, Thermochimica Acta, vol. 344, Issues 1-2, Jan. 2000, pp. 85-94.*
Reddy et al, Recovery of Na2SO4—10H2O from a reverse osmosis retentate by eutectic freeze crystallisation technology, Chemical Engineering Research and Design, vol. 88, Issue 9, Sep. 2010, pp. 1153-1157.*
"Sodium Sulfate Decahydrate", http://www.sigmaaldrich.com/catalog/product/sial/403008?lang=en&region=US, accessed on Jun. 28, 2016.*
"Sodium Sulfate", http://www.sigmaaldrich.com/catalog/product/sial/238597?lang=en&region=US, accessed on Jun. 28, 2016.*
DOE Hydrogen Program. FY 2004 Progress Report: II.F.2 Renewable Electrolysis Integrated System Development and Testing. pp. 119-122.
National Renewable Energy Laboratory (NREL). Technology Brief: Analysis of Current-Day Commercial Electrolyzers. Sep. 2004. 2 pages.
Serpentine Locks Up Carbon Dioxide. www.physorg.com. Sep. 2, 2004. 1 page.
Friedland et al. Hydrogen Production Through Electrolysis. Proceedings of the 2001 DOE Hydrogen Program Review. May 2001. 10 pages.
Harrison et al. Characterizing Electrolyzer Performance for Use in Wind Energy Applications. NREL/PR-560-40100. Presented at the American Wind Energy Association's WindPower annual conference. Jun. 4-7, 2006. 28 pages.
Kroposki et al. Electrolysis: Information and Opportunities for Electric Power Utilities. Technical Report. NREL/TP-581-40605. Sep. 2006. 33 pages.
Kroposki, Ben. Renewable Electrolysis Integrated System Development and Testing. NREL/PR-560-39803. Presented at the 2006 DOE Hydrogen, Fuel Cells & Infrastructure Technologies Program Review. May 16, 2006. 27 pages.
Ivy, Johanna. Summary of Electrolytic Hydrogen Production. Milestone Completion Report. NREL/MP-560-36734. Sep. 2004. 27 pages.
NREL. Wind-To-Hydrogen Project. www.nrel.gov/hydrogen/proj_wind_hydrogen.html. Content as last updated on Jun. 1, 2007. 2 pages.
Levene et al. Wind Energy and Production of Hydrogen and Electricity—Opportunities for Renewable Hydrogen. Conference Paper. NREL/CP-560-36934. To be presented at the 2006 Power-Gen Renewable Energy and Fuels Technical Conference. Mar. 2006. 18 pages.
Mandin et al. Electrochemical Process Modelling: Water Electrolysis for Hydrogen Production. CHISA 2006: 17th International Congress of Chemical and Process Engineering. Praha, Czech Republic. Aug. 27-31, 2006. 7 pages.

* cited by examiner $2Na_2SO_4 + 6H_2O \rightarrow 2H_2 + 2H_2SO_4 + O_2 + 4NaOH$

SULFATE-BASED ELECTROLYSIS PROCESSING WITH FLEXIBLE FEED CONTROL, AND USE TO CAPTURE CARBON DIOXIDE

RELATED APPLICATIONS

This application claims a benefit of U.S. Provisional Application No. 61/465,736 filed on Mar. 24, 2011 entitled "CONVERSION OF GYPSUM FOR USE IN REDUCED CARBON PRODUCTION PROCESSES", the entire contents of which are incorporated herein by reference.

FIELD OF THE INVENTION

The invention relates to electrolytic processing of alkali metal sulfate salt solutions, preparation of electrolyte solutions used in such electrolytic processing, capture of carbon dioxide using hydroxide produced during such electrolytic processing, regeneration of alkali sulfate material for use in further electrolytic processing, and processing of mixed salt solutions including dissolved sodium sulfate and sodium chloride.

BACKGROUND OF THE INVENTION

Carbon dioxide capture and sequestration have gained significant attention over the last decade due in part to concerns over the role carbon dioxide may play as a greenhouse gas in relation to climate change or global warming. One approach that has been suggested for capturing carbon dioxide involves electrolytic salt splitting in an aqueous system to prepare a hydroxide, which may then be reacted with gaseous carbon dioxide to capture the carbon dioxide in the form of a carbonate. Processes have been proposed using a variety of salts in electrolyte solutions subjected to electrolysis, including the use of sodium chloride or sodium sulfate. Some proposed processing, equipment and systems involving the use of some sulfate salts, including sodium sulfate, are described in U.S. Patent Publication 2008/0245660 entitled "RENEWABLE ENERGY SYSTEM FOR HYDROGEN PRODUCTION AND CARBON DIOXIDE CAPTURE"; U.S. Patent Publication 2008/0245672 entitled "ELECTROCHEMICAL METHODS TO GENERATE HYDROGEN AND SEQUESTER CARBON DIOXIDE"; and U.S. Patent Publication 2008/0248350 "ELECTROCHEMICAL APPARATUS TO GENERATE HYDROGEN AND SEQUESTER CARBON DIOXIDE"; the contents of each and every one of which is incorporated by reference herein in entirety.

Technologies directed to sequestering carbon dioxide must be scalable to a very large scale, on the order of being able to capture millions of tons of carbon dioxide. At such a large scale, implementation of such technologies will need to be both economic and environmentally sound.

SUMMARY OF THE INVENTION

A major impediment to large-scale adoption of chloride electrolyte systems is that such systems produce large quantities of chlorine, a highly toxic substance. Presently there is a reasonable commercial demand for chlorine relative to supply. However, if chloride-based electrolysis systems were implemented for use to capture carbon dioxide on a large scale, the world-wide production of chlorine would be expected to rise dramatically, leading to a large excess of chlorine supply relative to reasonable anticipated commercial demand. Given the highly toxic nature of chlorine, this presents a significant long-term economic and environmental challenge in relation to use of chloride electrolyte solutions.

The use of sulfate electrolyte solutions (including bisulfate solutions) provides a number of possible advantages over the use of chloride electrolyte solutions. Instead of producing a chlorine product, sulfate systems may generate an oxygen gas product, which does not raise the same economic or environmental problems as with chlorine in terms of large-scale implementation for carbon capture and sequestration. Oxygen gas is not a toxic substance. However, one concern with the use of sodium sulfate, a preferred sulfate salt, is that sodium sulfate salt reagent products are more expensive than sodium chloride salt reagent products.

Another concern with the use of sodium sulfate is that, because of the prevalence of sodium chloride, commercial grade sodium sulfate reagent salt products tend to contain at least small amounts of sodium chloride. In the sodium sulfate electrolysis system, these small amounts of chloride will contribute to production of small amounts of chlorine that will tend to be collected with oxygen gas in a sulfate system. Although the generation of such small amounts of chlorine may not be a major technical issue in terms of operating sodium sulfate-based electrolysis systems, such small amounts of chlorine generation present a long-term problem with implementation of sodium sulfate-based electrolysis systems at a large enough scale to capture significant quantities of carbon dioxide. Even the presence of a few hundred parts per million of chloride in sodium sulfate salt reagent feeds may generate excessive chlorine on a cumulative basis on such a large scale of implementation. The generation of such byproduct chlorine may be significantly reduced or eliminated by using extremely pure sodium sulfate salt reagent products, but such high-purity reagents are significantly more expensive.

A first aspect of the invention provides a method for chemical manufacture involving electrolysis processing of an aqueous electrolyte solution including sulfate-based electrolyte components. The method involves processing that may provide flexibility to accommodate a variety of sulfate feed sources to provide sulfate electrolyte material for use in sulfate-based electrolysis processing. Such processing may accommodate the presence of significant chloride concentrations in the initial feed source, permitting the use of feed sources other than high-purity salt reagent products and without significant problems associated with chlorine generation. Examples of some sulfate feed sources include agricultural drainage water, groundwater, surface water, industrial waste water, produced water from oil or hydrocarbon gas production, solid industrial wastes, mineral materials and solid anhydrous sodium sulfate salt reagent products, even if such feed sources contain significant quantities of sodium chloride.

The method for chemical manufacture of the first aspect of the invention comprises:

electrolysis processing of an aqueous electrolyte solution, the electrolysis processing comprising electrolyzing water of the aqueous electrolyte solution to generate hydronium ions at an anode and hydroxide ions at a cathode;

preparing feed solids of sodium sulfate decahydrate, the preparing feed solids of sodium sulfate decahydrate comprising precipitating sodium sulfate decahydrate from an aqueous salt solution;

preparing a feed of the aqueous electrolyte solution, the preparing the feed of the aqueous electrolyte solution comprising dissolving in water at least a portion of the feed solids of the sodium sulfate decahydrate; and providing the feed of the aqueous electrolyte solution to the electrolysis processing.

A number of feature refinements and additional features are applicable to the first aspect of the invention. These feature refinements and additional features may be used individually or in any combination. As such, each of the following features, and features described elsewhere herein, may be, but are not required to be, used with any other feature or combination of the first aspect.

The precipitating may include precipitating a large quantity of sodium sulfate decahydrate. Such a quantity may be at least 100 grams of sodium sulfate decahydrate per liter of the aqueous salt solution. The precipitating may be conducted at a mildly basic pH. The pH may, for example, be in a range of from pH 7.5 to pH 9, or may be in a range of pH 8 to pH 8.5.

The precipitating may be performed via chilling with energy consumption for the chilling per ton (2000 pounds) of sodium sulfate decahydrate precipitated being preferably not more than 1,500,000 BTUs (British Thermal Units), more preferably not more than 1,000,000 BTUs, even more preferably not more than 750,000 BTUs, still more preferably not more than 600,000 BTUs and most preferably not more than 500,000 BTUs.

The feed of the aqueous salt solution provided to the preparing the feed of the aqueous electrolyte solution may be a mixed salt solution comprising dissolved sulfate and chloride salts, and the feed of the aqueous salt solution comprises from 5 to 15 weight percent dissolved sodium chloride. The feed of the aqueous salt solution may comprise at least 5 weight percent or even more of dissolved sodium sulfate.

The precipitating may include reducing the temperature of the aqueous salt solution from a first temperature of at least 20° C., at least 25° C., at least 30° C. or even higher to a second temperature of no higher than 10° C., no higher than 7° C., no higher than 5° C. or even lower. Such a second temperature may often be at least 0° C. The precipitating may include maintaining a temperature of the aqueous salt solution at 10° C. or lower for at least 10 minutes or even longer.

The method may include, after the precipitating and prior to the preparing the feed of the aqueous electrolyte solution, separating aqueous liquid from precipitated sodium sulfate decahydrate. The method may include, after such separating and prior to the preparing the feed of the aqueous electrolyte solution, washing the sodium sulfate decahydrate with aqueous wash liquid to remove residual contaminants.

The water to the dissolving may be provided at an elevated temperature, for example at a temperature of at least 30° C. or even higher.

The preparing the feed of the aqueous electrolyte solution may comprises dissolving into the water at least 200 grams of the sodium sulfate decahydrate per liter of the water.

A feed of the aqueous salt solution to the preparing feed solids of the sodium sulfate decahydrate may comprise a significant level of dissolved chloride, for example at least 200 milligrams or more of dissolved chloride per liter of the feed of the aqueous salt solution. The method may include, prior to the preparing the feed solids of sodium sulfate decahydrate, preparing a feed of the aqueous salt solution that is provided for use during the preparing feed solids. Preparing such a feed of the aqueous salt solution may comprise desalinating an aqueous salt-containing feed liquid to prepare a desalinated liquid and a liquid concentrate comprising a higher level of total dissolved solids than the feed liquid. Such a feed liquid may comprise at least 1000 parts per million by weight or even more of dissolved sodium sulfate. Preparing such a feed of the aqueous salt solution may comprise dissolving a solid sodium sulfate salt product in a liquid comprising at least a portion of the concentrate. Such a solid sodium sulfate salt product may comprise significant chloride, which may be in the form of sodium chloride. For example, such a solid sodium salt product may comprise at least 500 parts per million by weight or even more of sodium chloride. Preparing the feed of the aqueous salt solution may involve removing multivalent metal ions (e.g., calcium and/or magnesium) from a precursor feed (e.g., liquid feed or solid salt product feed).

The feed of the aqueous electrolyte solution may be made to comprise a concentration of dissolved chloride of no more than 100 milligrams per liter or an even lower concentration.

The method may include collecting an oxygen gas product comprising oxygen gas generated at the anode during the electrolysis processing. Such an oxygen gas product include no more than 10,000 parts per million by weight of chlorine, no more than 5,000 parts per million by weight of chlorine, no more than 1000 parts per million by weight of chlorine, no more than 500 parts per million by weight of chlorine or an even lower concentration of chlorine.

The method may include collecting a hydrogen gas product comprising hydrogen gas generated at the cathode during the electrolysis processing.

The aqueous electrolyte solution may comprise dissolved sodium-containing sulfate material selected from the group consisting of sodium sulfate, sodium bisulfate. The electrolysis processing may include supplying the aqueous electrolyte solution to an electrolysis rector including one or more electrolysis cells. Such aqueous electrolyte solution as supplied to an electrolysis reactor may or may not have the same composition as the feed of the electrolysis solution. The feed of the aqueous electrolyte solution may be subjected to modification or further processing before an electrolyte solution is supplied to such an electrolysis reactor.

The method may include preparing acidic sulfate material. Such acidic sulfate material may be selected from the group consisting of sulfuric acid, sodium bisulfate and combinations thereof.

The method may include preparing a carbonate-containing solution, comprising contacting sodium hydroxide in solution with carbon dioxide to form dissolved sodium-containing carbonate material. Such sodium-containing carbonate material may be selected from the group consisting of sodium carbonate, sodium bicarbonate and combinations thereof. Such carbon dioxide may be provided in an ambient air, or may be from another source. The carbon dioxide may be provided in combustion flue gas. The method may include preparing regenerated sodium-containing sulfate material, which may comprise contacting a calcium sulfate reagent with at least a portion of the carbonate-containing solution comprising the dissolved sodium-containing carbonate material, to precipitate calcium carbonate and form dissolved sodium-containing sulfate material. A feed of aqueous salt solution for preparing sodium sulfate decahydrate may comprise at least a portion of the regenerated sodium-containing sulfate material. Such a calcium sulfate reagent may be from a variety of sources, for example the calcium sulfate reagent may comprise calcium sulfate from flue gas desulfurization or from mineral processing waste or may include a mined mineral material containing calcium sulfate. Preferably, at least a portion of the calcium sulfate reagent is in solution when provided to contact the carbonate-containing solution. In some preferred implementations, contacting the calcium sulfate reagent and carbonate-containing solution comprises adding the carbonate-containing solution to a solution containing dissolved calcium sulfate, which solution containing dissolved calcium sulfate may be slurried with additional calcium sulfate in solid particulate form. The carbonate-containing solution may include the dissolved sodium-containing carbonate material at any desired concentration, such as at a concentration of at least 5 weight percent, at least 10 weight percent, at least 15 weight percent, at least 20 weight percent or even at least 25 weight percent or more. Most or substantially all of the dissolved sodium in carbonate form may be converted to sulfate form, and preferably at least 90 percent or more, and may result in a solution containing at least 5 weight percent, at least 10 percent, at least 15 weight percent, at least 20 weight percent or even at least 25 weight percent or more of the dissolved sodium-containing sulfate material. The calcium sulfate reagent may be provided in a form including a slurry containing liquid with some dissolved calcium sulfate and having slurried with the liquid some calcium sulfate in solid particulate form, and may have a total concentration of dissolved and particulate calcium sulfate of at least 5 weight percent, at least 10 weight percent, at least 15 weight percent, at least 20 weight percent or even at least 25 weight percent or more. The slurry may contain a calcium sulfate solids content of at least 5 weight percent, at least 10 weight percent, at least 15 weight percent, or even at least 20 weight percent or more. The calcium sulfate reagent may be provided in a form including at least some of the calcium sulfate dissolved in a solution also containing dissolved sodium chloride, which dissolved sodium chloride may be at a concentration of at least 5 weight percent, at least 7 weight percent or at least 10 weight percent. Carbonate-containing solution contacted with the calcium sulfate reagent may include, in addition to the dissolved sodium-containing carbonate material, dissolved sodium chloride, which dissolved sodium chloride may be at a concentration of at least 5 weight percent, at least 7 weight percent or at least 10 weight percent.

A second aspect of the invention provides a method for chemical manufacture, which method comprises:

preparing aqueous electrolyte solution comprising dissolved alkali metal-containing sulfate material selected from the group consisting of alkali metal sulfate, alkali metal bisulfate and combinations thereof;

preparing alkali metal hydroxide and acidic sulfate material, comprising subjecting the electrolyte solution to electrolysis processing, wherein the electrolysis processing comprises electrolyzing water of the electrolyte solution to generate hydronium ions at an anode and hydroxide ions at a cathode, and wherein the acidic sulfate material is selected from the group consisting of sulfuric acid, alkali metal bisulfate and combinations thereof;

wherein the preparing aqueous electrolyte solution comprises;

contacting aqueous carbonate-containing solution with a calcium sulfate reagent to precipitate calcium carbonate and form dissolved alkali metal-containing sulfate substance, wherein the aqueous carbonate-containing solution comprises dissolved alkali metal-containing carbonate material selected from the group consisting of alkali metal carbonate, alkali metal bicarbonate and combinations thereof, and wherein the alkali metal-containing sulfate substance is selected from the group consisting of alkali metal sulfate, alkali metal bisulfate and combinations thereof;

using at least a portion of the alkali metal-containing sulfate substance to provide the dissolved alkali metal-containing sulfate material in the electrolyte solution.

A third aspect of the invention provides a method for chemical manufacture, the method comprising:

preparing acidic sulfate material and alkali metal hydroxide, comprising subjecting an aqueous electrolyte solution to electrolysis processing, wherein the electrolysis processing comprises electrolyzing water of the electrolyte solution to generate hydronium ions at an anode and hydroxide ions at a cathode; wherein the electrolyte solution comprises dissolved alkali metal-containing sulfate material selected from the group consisting of alkali metal sulfate, alkali metal bisulfate and combinations thereof, and wherein the acidic sulfate material is selected from the group consisting of sulfuric acid, alkali metal bisulfate and combinations thereof;

preparing a carbonate-containing solution, comprising contacting carbon dioxide with at least a portion of the alkali metal hydroxide to form dissolved alkali metal containing carbonate material selected from the group consisting of alkali metal carbonate, alkali metal bicarbonate and combinations thereof; and contacting a solution comprising at least a portion of the alkali metal carbonate material with a calcium sulfate reagent to precipitate calcium carbonate and form regenerated alkali metal-containing sulfate material selected from the group consisting of alkali metal sulfate, alkali metal bisulfate and combinations thereof.

A number of feature refinements and additional features are applicable to each of the second aspect and third aspect of the invention. These feature refinements and additional features may be used individually or in any combination. As such, each of the following features, and features described elsewhere herein, may be, but are not required to be, used with any other feature or combination of the second aspect or the third aspect.

The alkali metal may be sodium. The alkali metal may be potassium. In some preferred implementations, sodium is a preferred alkali metal, because of a high solubility of sodium sulfate. Potassium is often less preferred because of a generally lower solubility of potassium sulfate relative to sodium sulfate.

When the alkali metal in the second or third aspect is sodium, all or any portion of the processing with the second aspect may be as described with respect to the first aspect, and the processing of the second aspect may include any feature, additional feature or feature refinement of the first aspect. The preparing aqueous electrolyte solution according the second aspect may but need not include the use of sodium sulfate decahydrate feed solids. Such feed solids of sodium sulfate decahydrate may be prepared as described with the first aspect. The preparing aqueous electrolyte solution according the second aspect may include dissolving in water a solid sodium sulfate salt reagent with the sodium sulfate salt reagent in an anhydrous form.

When the alkali metal is potassium, all or any portion of the processing with the second aspect may be as describes with respect to the first aspect, suitably adapted to the properties of potassium relative to sodium, except that of course processing will not involve the preparation of or use of potassium sulfate decahydrate. The initial source of potassium sulfate may be a commercially available potassium sulfate reagent product, or may be provided from a different source.

The calcium sulfate reagent may be in the form of a waste material containing contaminants. Such waste material may result from flue gas desulfurization, industrial processing or mining or mineral processing applications. By dissolving the calcium sulfate and reconstituting its components in calcium carbonate and sodium sulfate, which may effectively separate the calcium sulfate from the contaminants, and with may result in a concentrating the contaminants in a smaller solid or liquid stream. For example, waste gypsum from mining operations (e.g., phosphate, zinc, nickel mining) may contain radioactive or toxic metals (e.g., cadmium, etc.) which render the waste gypsum hazardous. The sodium sulfate may then be processed to prepare feed of electrolyte solution for electrolysis processing to create sulfuric acid, which could be used in the mining or mineral processing operation from which the waste gypsum resulted. Acidic sulfate solutions are often used in such mining operations, for example in leaching or other operations.

A fourth aspect of the invention provides a method for treating mixed salt solution comprising dissolved chloride and sulfate salts, the method comprising:

selectively precipitating sodium sulfate decahydrate from an aqueous salt solution, wherein immediately before the selectively precipitating the salt solution comprises dissolved sodium chloride and dissolved sodium-containing sulfate material selected from the group consisting of sodium sulfate, sodium bisulfate and combinations thereof;
wherein the selectively precipitating comprises:
reducing the temperature of the aqueous salt solution from a first temperature of at least 25° C. to a second temperature in a range of 7° C. or lower; and
precipitating sufficient sodium sulfate decahydrate to reduce the amount of the dissolved sodium-containing sulfate material in the salt solution by at least 90 percent; and
retaining dissolved in the salt solution at least 90 percent of the sodium chloride;
wherein a feed of the aqueous salt solution to the selectively precipitating comprises a concentration of dissolved sodium chloride of at least 3 weight percent, and during the selectively precipitating the concentration of the dissolved sodium chloride is maintained at or above 3 weight percent.

A number of feature refinements and additional features are applicable to each of the fourth aspect of the invention. These feature refinements and additional features may be used individually or in any combination. As such, each of the following features, and features described elsewhere herein, may be, but are not required to be, used with any other feature or combination of the fourth aspect.

All or any portion of the processing with the fourth aspect may be as described with respect to the first aspect, and the processing of the fourth aspect may include any feature, additional feature or feature refinement of the first aspect. The selectively precipitating of the fourth aspect may be or include features according to any of the description provided with respect to the precipitating sodium sulfate decahydrate for the first aspect. The aqueous salt solution of the fourth aspect may be or include features, or be prepared using processing, according to any of the description provided with respect to the feed of the aqueous electrolyte solution for the first aspect. Likewise, any of the processing or other features described with respect to the fourth aspect may be used with the first aspect.

The method may include, prior to the selectively precipitating, removing dissolved multivalent metal ions (e.g., calcium and/or magnesium) from the aqueous salt solution. Such multivalent metal ions may be removed, for example, selective ion receiving techniques. Such multivalent metal ions may be removed by selective staged precipitation, complexing agents or ion exchange resins.

The selectively precipitating may comprise reducing the amount of the dissolved sodium-containing sulfate material in the salt solution by at least 95 percent, at least 97 percent or at least 99 percent. As will be appreciated, the "amount" of the sodium-containing sulfate material in the salt solution is not the same as the concentration. The bound water in precipitated sodium sulfate decahydrate removes water from the salt solution, and somewhat mitigates concentration changes for the dissolved sodium-containing sulfate material. Likewise, the concentration of dissolved sodium chloride in the solution may increase significantly during the selectively precipitating, due to the loss of solution water to bound water in the sodium sulfate decahydrate precipitate. Therefore, the concentration of dissolved sodium chloride in the aqueous salt solution will typically be maintained at or above the concentration in the feed of the aqueous salt solution throughout the selectively precipitating.

Possible additional features and feature refinements that may be used with any of the aspects of the invention are provided within the discussion below.

DETAILED DESCRIPTION OF THE INVENTION

Figure 1:
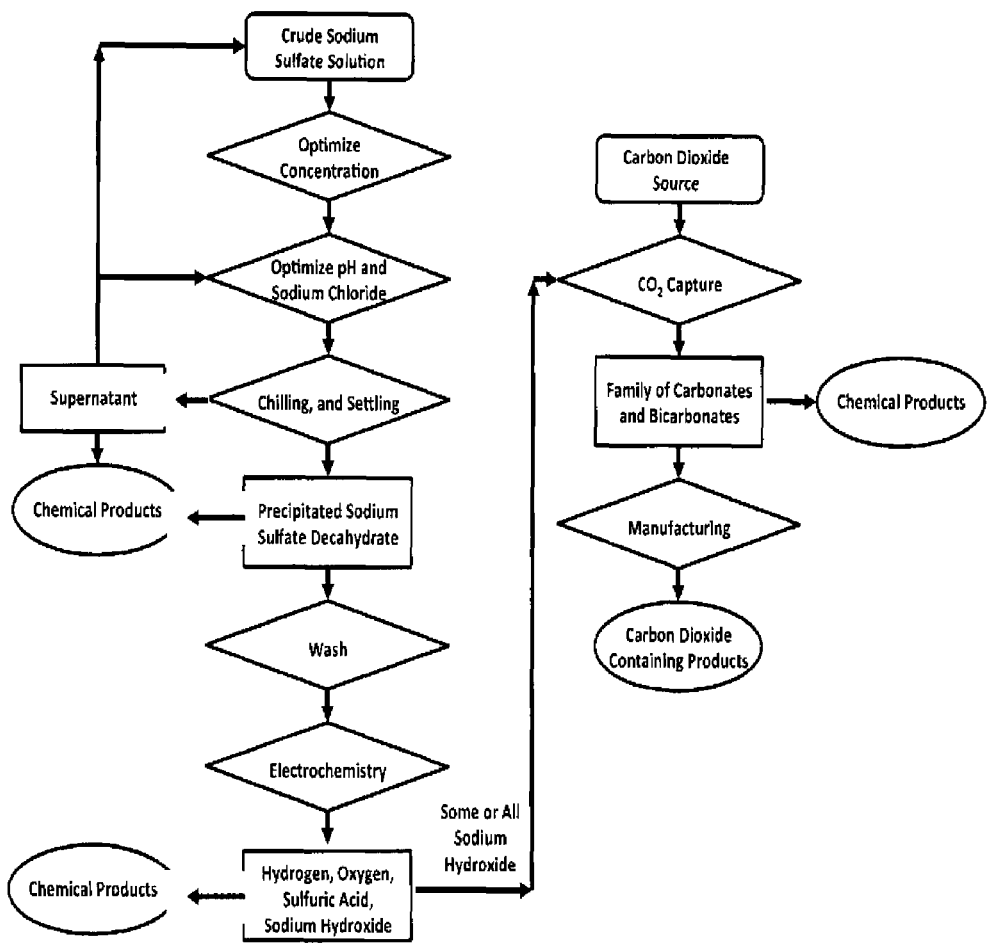
FIG. 1 is a general process block diagram of an embodiment of processing according to the invention.

The invention provides various methods that help to address the relatively high cost of sodium sulfate salt reagents relative to sodium chloride salt reagents, and in particular the widespread presence of at least small amounts of sodium chloride in sodium sulfate-based systems, and accommodates significant flexibility in feed sources for sulfate electrolyte salt.

The description provided herein is discussed primarily in terms of sodium. The same principles apply, however, in relation to processing using potassium instead of sodium, except that discussions concerning sodium sulfate decahydrate processing do not apply in the case of potassium.

The description of the invention is provided primarily in the context of process combinations involving electrolysis processing, but the principles discussed in relation to processing mixed salt solutions apply equally in a water treatment context in the absence of electrolysis processing and in the absence of preparation of a feed of electrolyte solution for such processing. Use of such techniques may be used to treat mixed salt solutions containing dissolve alkali metal sulfate and chloride salts. Resulting sodium sulfate decahydrate precipitate may be used or sold as a product, or may be converted to an anhydrate salt form to reduce weight for shipping. Resulting salt solution following precipitation of sodium sulfate decahydrate may be, or may be further processed to prepare, a useful sodium chloride solution, such as may be suitable for use as a chemical or electrochemical reagent or for injection into oil and gas formations, for example as part of an oil or gas enhanced recovery operations.

The present invention encompasses methods to isolate salt reagents for electrochemical salt splitting and subsequent $CO_2$ capture, thereby resulting in low carbon and carbon negative chemical manufacturing systems. More specifically sodium sulfate is purified from water or crude minerals, including industrial waste such as crude salt cake. The more pure form of sodium sulfate is then electrochemically converted to generate hydrogen, oxygen, sulfuric acid and sodium hydroxide, of which the sodium hydroxide is reacted with carbon dioxide to produce sodium carbonate or sodium bicarbonate.

Sodium sulfate is the second most common soluble salt occurring in nature, as reported by Garrett, D. E., (2001), *Sodium Sulfate; Handbook of Deposits, Processing, Properties and Uses*, Academic Press, San Diego, Calif. Less than 1% of the world's sodium sulfate is available as mineralized deposits, and therefore much of the available resource is dissolved in the waters of rivers, lakes, aquifers, inland seas and oceans. However, aqueous sources of sodium sulfate are often found with other salts, most notably sodium chloride.

Mixed salt solutions containing sodium sulfate have little if any value and are common waste streams in mining, manufacturing, agriculture, and desalination operations. In particular, reject brine resulting from inland desalination projects represent a significant disposal cost that can adversely impact the overall economic viability of water treatment. Conversely, purified sodium sulfate can be converted to high value products with strong environmental benefits. Therefore, methods are needed to process such mixed salts into their individual components. More specifically, isolation and recovery of sodium sulfate from mixed salt solutions is needed to reduce industrial waste streams and provide an economical means of sourcing high purity sodium sulfate.

The solubility of sodium sulfate in water is strongly dependent on temperature. At appropriate concentrations high purity sodium sulfate can be precipitated as a decahydrate crystal from mixed salt solutions upon chilling. Most other common salts do not share such strong solubility-temperature dependence and therefore remain in solution. Aqueous sodium sulfate is frequently associated with significant concentrations of sodium chloride. When a mixed solution of sodium sulfate and sodium chloride is chilled, sodium sulfate is precipitated and sodium chloride remains in solution. Both salts are then potentially pure enough to be marketable products, and further electrochemical processing can create a family of higher valued products including sodium hydroxide base. The hydroxide base can be further reacted with carbon dioxide to produce $CO_2$-negative carbonates and low carbon end user products made from them, such as using the New Sky Process described below. Thus, the processing of waste salt streams can result in a product portfolio that is both profitable and environmentally beneficial.

The present invention encompasses methods to isolate salt reagents for electrochemical salt splitting and subsequent $CO_2$ capture, thereby resulting in low carbon and carbon negative chemical manufacturing systems. More specifically sodium sulfate is purified from water or crude minerals, including industrial waste such as crude salt cake. FIG. 1 summarizes various embodiments of the present invention, indicating inputs, process steps, outputs and resulting products.

In one embodiment, water containing sodium sulfate is purified by reverse osmosis (RO) or distillation, desalination or other methods known in the art, and the resulting reject brine is concentrated to achieve a sodium sulfate concentration of 5% w/vol or higher. Upon cooling or evaporation, the sodium sulfate crystallizes from solution. The resulting sodium sulfate decahydrate crystals are greater than 99.5% pure. The sodium sulfate product is then converted in a salt splitting electrochemical reactor to form hydrogen, oxygen, sulfuric acid and sodium hydroxide. The sodium hydroxide is reacted with carbon dioxide to make sodium carbonate. Some example electrochemical reactors and $CO_2$ capture and conversion processing is described in U.S. Patent Publications 2008/0248350, 2008/0245672 and 2008/0245660 assigned to New Sky Energy, Inc., which are incorporated by reference herein and presently referred to as the New Sky Process. The entire process for isolating sodium sulfate described herein, combined with the New Sky Process for producing carbonates may generate less carbon dioxide than is sequestered in the resulting carbonates, thereby resulting in a $CO_2$ negative manufacturing process.

In another embodiment, surface water or groundwater containing greater than 1000 ppm sodium sulfate is desalinated by reverse osmosis, forward osmosis, ion exchange, membrane distillation, solar evaporation, thermal distillation or other desalination techniques and the resulting reject brine is concentrated to achieve a sodium sulfate concentration greater than 5% w/vol. If necessary, sodium chloride concentration is increased to at least 5% w/vol, which significantly decreases the solubility of sodium sulfate. Under most conditions, optimal yield is obtained with 7%-25% w/vol sodium sulfate and 7%-10% w/vol sodium chloride. Upon cooling the solution to less than 10° C., the sodium sulfate decahydrate crystallizes from solution. The crystals are washed, and isolated. The sodium sulfate decahydrate product is greater than 99.5% pure. The sodium sulfate decahydrate is converted in a salt splitting electrochemical reactor as described above to make hydrogen, oxygen, sulfuric acid and sodium hydroxide. Some or all of the sodium hydroxide is reacted with carbon dioxide from air, flue gas streams or concentrated $CO_2$ stream to make sodium carbonate or sodium bicarbonate. Thus, a low or carbon negative process for producing carbonates and bicarbonates, as well as the resultant products that incorporate such carbonates/bicarbonates is described. Depending on the energy source the entire system may generate substantially less carbon dioxide than is sequestered in the sodium carbonate or bicarbonate, resulting in a carbon negative manufacturing process and resulting products that consume rather than produce $CO_2$.

In a preferred embodiment, agricultural drainage water is desalinated by reverse osmosis or other purification techniques and reject brine with a minimal total dissolved salt (TDS) concentration of 50,000 ppm is collected. The reject brine is concentrated so that the aqueous sodium sulfate concentration is greater than 5% w/vol. If sodium chloride is present at levels between 1%-5% w/vol, then additional sodium chloride may be added to achieve a concentration of 5-15%. The pH is adjusted to a range of 7.5 to 9.5. The solution is cooled using a heat exchanger or other chilling method. Upon cooling the solution to less than 10° C., sodium sulfate decahydrate crystallizes from solution. Optimal yield is obtained at temperatures between 0 to 5° C. To precipitate one ton of sodium sulfate decahydrate via chilling preferably requires energy consumption to perform the chilling of not more than 1,500,000 British Thermal Units (BTUs), more preferably not more than 1,000,000 BTUs, even more preferably not more than 750,000 BTUs, still more preferably not more than 600,000 BTUs and most preferably not more than 500,000 BTUs. The sodium sulfate decahydrate crystals are collected and washed with a chilled saturated aqueous solution of sodium sulfate. The resulting sodium sulfate decahydrate product is greater than 99.5% pure. Furthermore, the remaining sodium chloride solution can be sold or used as a chemical or electrochemical reagent.

In the embodiments described herein, it is understood that ion exchange and/or affinity techniques that do not bind sodium and sulfate ions may be used to remove otherwise unwanted ions. These techniques can be used at steps prior to or after precipitation of sodium sulfate decahydrate. For example, just prior to thermal chilling a mixed brine solution may be subjected to ion exchange. Since sodium and sulfate have very weak association to anion and cation exchange resins, they do not bind, whereas ions with higher ionic interactions, such as calcium or nitrate would bind to the ion exchange resins. The remaining solution is chilled to precipitate sodium sulfate decahydrate. Once the sodium sulfate crystals are washed and then dissolved, the solution is subjected to affinity purification. For example, ethylenediaminetetracetate (EDTA, $(HO_2CCH_2)_2NCH_2CH_2N(CH_2CO_2H)_2$) could be attached to a resin, membrane or other solid support. Only calcium and magnesium would be bound to the EDTA and removed from the brine, while the vast majority of the ions in the form of sodium, sulfate and chloride would not bind. The distinguishing feature of this strategy is that ion exchange and or affinity techniques are used to remove unwanted minority components of the mixed brine solution. This allows large quantities of sodium sulfate to be purified to requisite levels using minimal equipment, energy and effort and at a reduced cost.

Numerous minerals, such as mirabilite ($Na_2SO_4.10H_2O$), thenardite ($Na_2SO_4$), glauberite ($Na_2SO_4.CaSO_4$) and burkeite ($2Na_2SO_4.Na_2CO_3$) exist in the environment containing sodium sulfate in their natural form. In another embodiment, one or more of these crude minerals or industrially derived salt cake containing sodium sulfate is dissolved in water at a concentration of at least 10%. If sodium chloride is present at concentrations between 1-5% w/vol, then sodium chloride may be added to bring the concentration to 5-15% w/vol. The pH is adjusted to a range of 7.5 to 9.5. The solution is cooled using a heat exchanger or other chilling method, followed by settling in a precipitation tank. Upon cooling the solution to less than 10° C., the sodium sulfate decahydrate crystallizes from solution and is recovered. Optimal yield is obtained at 0° C. to 5° C. The crystals are collected and washed with a chilled saturated aqueous solution of sodium sulfate. The sodium sulfate decahydrate product is greater than 99.5% pure. The sodium sulfate decahydrate comprises less than 0.5% sodium chloride contamination.

Some or all of the resulting sodium sulfate decahydrate product is used in an electrochemical salt splitter to make hydrogen, oxygen, sulfuric acid and sodium hydroxide. Some or all of the sodium hydroxide is reacted with carbon dioxide, from air, flue gas streams, mixed gas streams or concentrate, to make carbonates, including sodium carbonate or sodium bicarbonate as previously described in U.S. Patent Publications 2008/0248350, 2008/0245672 and 2008/0245660 assigned to New Sky Energy, Inc. The New Sky Process is optimal for converting isolated sodium sulfate into carbonates such as soda ash, baking soda, precipitated calcium carbonate (PCC) and limestone. Sodium carbonate can be further processed into any of the Group 1 or Group 2 carbonates. Depending on the energy source used for electrochemistry the entire system may generate less carbon dioxide than is sequestered in the sodium carbonate, thereby resulting in a carbon negative process that consumes $CO_2$.

The New Sky Process is a chemical pathway for converting sodium, lithium or potassium sulfate or other non-halide salts into acid and base in an electrochemical reactor, followed by $CO_2$ capture from the air or flue gas by the base (sodium, lithium or potassium hydroxide) to form sodium, lithium or potassium carbonate. The net result of the New Sky Process may be the production of several carbon neutral and carbon negative chemicals, including sulfuric acid, sodium/lithium/potassium hydroxide, hydrogen, oxygen and carbonates such as sodium/lithium/potassium bicarbonate or sodium/lithium/potassium carbonate.

The combined suite of products of the present invention and New Sky Process may be either carbon neutral commodity chemicals, including sulfuric acid, sodium/lithium/potassium hydroxide, hydrogen, and oxygen, or $CO_2$ negative carbonates, such as sodium/lithium/potassium carbonate, sodium/lithium/potassium bicarbonate and calcium/magnesium carbonate. Numerous value-added products may be produced from the carbonates, bicarbonates acid, base, hydrogen and oxygen generated by the New Sky Process and isolated sodium sulfate described herein. The resulting $CO_2$ negative carbonates and bicarbonates are used in the production of a wide range of building materials including glass, cement and concrete and as fillers in plastics, elastomers, adhesives, and other polymer based materials. Sodium carbonate is used in manufacturing glass, and solid sodium bicarbonate can be purified and sold as baking soda, incorporated as a filler or fire suppressant into resins or polymers, or used as a SOx scrubbing agent in flue gas desulfurization. Calcium carbonate is widely used in cement, concrete, and other cementitious building materials. The combined pathways described above represent carbon neutral and carbon negative manufacturing strategies that may consume more $CO_2$ than is produced in their manufacture.

The present invention also encompasses methods involving a novel chemical pathway to convert natural or waste gypsum into calcium carbonate and sodium sulfate. A gypsum slurry or gypsum-saturated solution is contacted with sodium carbonate, resulting in a double replacement reaction that produces calcium carbonate and sodium sulfate. The sodium sulfate may be used in an electrochemical reactor to produce sulfuric acid, hydrogen, oxygen and sodium hydroxide, or, in some embodiments, simply sulfuric acid and sodium hydroxide. Sodium hydroxide may in turn be reacted with $CO_2$ from the air or flue gas to form sodium carbonate, which, combined with gypsum, closes the chemical cycle and sequesters $CO_2$ as a solid carbonate for use in building materials or other useful products.

Gypsum ($CaSO_4 \cdot 2H_2O$) is a highly abundant natural mineral in the Earth's crust, particularly in arid or highly weathered soils of low value for other uses. Significant, readily mined reserves of gypsum are available in North America, Africa, Asia, Europe, Australia and South America. Gypsum is also widely generated as an industrial and construction waste material. Tens of millions of tons of waste gypsum are generated annually from flue gas desulfurization, mining and the construction industry, some of which is recycled for reuse in the building construction industry as gypsum board, panels (i.e. drywall) and plaster products.

It has been demonstrated that gypsum solutions or slurries react spontaneously with sodium carbonate ($Na_2CO_3$) to form calcium carbonate and sodium sulfate. When the $CO_2$ contained in the sodium carbonate is captured from the air or flue gas, a relatively low energy, chemically stable pathway is presented to store $CO_2$ in carbonates for sequestration or use in manufacturing. Sodium sulfate itself may be used in one such $CO_2$ capture pathway, creating a chemical cycle that sequesters $CO_2$ as calcium carbonate and generates a variety of useful chemical products from water, gypsum and sodium salts.

Applicants have developed innovative processes regarding $CO_2$ capture and conversion and for the generation of carbonates and other useful chemicals referred to as the "New Sky Process", as noted above.

Salts that can be used in the New Sky Process include, but are not limited to, alkali metal sulfates, nitrates, phosphates and carbonates, with sodium sulfate generally being preferred.

The present invention may convert waste or natural gypsum into calcium carbonate and sodium sulfate using sodium carbonate produced by the New Sky Process. Both the calcium and sulfate contained in gypsum are potentially useful materials in $CO_2$ sequestration and reuse strategies, particularly via the New Sky Process. Calcium is a primary component of limestone (calcium carbonate), which contains one $CO_2$ per molecule. By dissolving the calcium in gypsum, it is free to react with carbonate ions in solution to produce useful insoluble carbonates such as limestone.

This chemical cycle generates a new source of input sodium sulfate for use in the New Sky Process and simultaneously sequesters $CO_2$ in calcium carbonate for use in manufacturing or permanent $CO_2$ sequestration. Calcium carbonate is a more stable and less soluble chemical than sodium or potassium carbonate or gypsum itself.

Thus, applicants' invention describes the conversion of gypsum and $CO_2$ into useful solid carbonate forms including limestone, marble, concrete and precipitated calcium carbonate (PCC) for use in construction, plastic, paper, agriculture and other industries. Calcium carbonate can be converted into Portland cement, or combined with Portland cement and further processed into concrete products. These combined uses for calcium carbonate could effectively result in the storage of billions of tons of $CO_2$ in useful products. Thus, the present invention represents an industrially important pathway to sequester $CO_2$ in valuable products that simultaneously regenerates sodium sulfate to continue the chemical cycle.

The present invention provides a novel, environmentally beneficial use of gypsum as an input feedstock in a clean manufacturing process that sequesters $CO_2$ and produces multiple useful chemicals. As used herein, the term gypsum includes all solid forms of calcium sulfate, including hydrated and anhydrous forms, for example, calcium sulfate dihydrate, calcium sulfate hemihydrate and anhydrite. As described below, the addition of sodium carbonate solution to a gypsum slurry results in the conversion of gypsum to calcium carbonate and sodium sulfate. When coupled with the New Sky Process for generation of sodium carbonate from sodium sulfate and $CO_2$, the gypsum conversion process described herein results in several important environmental and economic benefits. These include net capture and conversion of $CO_2$ into carbonates for construction or industry, elimination of waste gypsum from industry or power generation, and regeneration of sodium sulfate for continual operation of the New Sky process.

Figure 17:
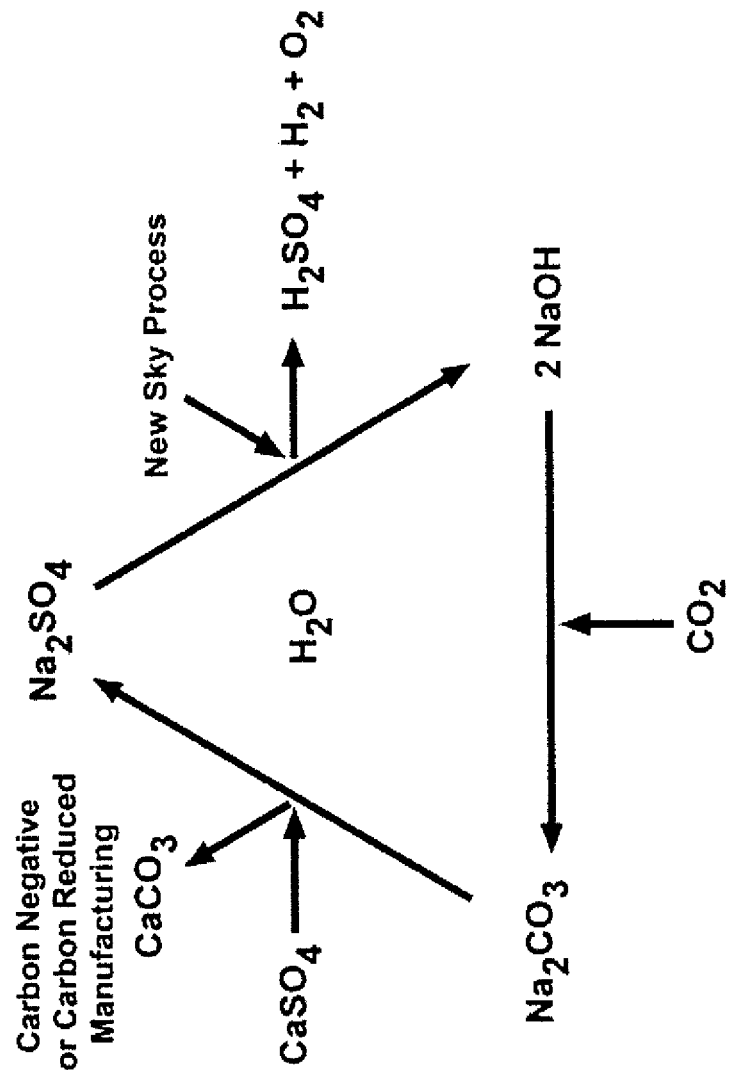
FIG. 17 is an illustration of a processing cycle of the invention using a feed of calcium sulfate.

As shown in FIG. 17, addition of sodium carbonate to gypsum (calcium sulfate) results in conversion of the gypsum to calcium carbonate and sodium sulfate. In the New Sky Process sodium sulfate is converted in an electrochemical reactor into sulfuric acid, sodium hydroxide, hydrogen and oxygen. Some or all of the sodium hydroxide is subsequently reacted with carbon dioxide from the atmosphere, flue gas or concentrated gas streams to form sodium carbonate. In the present process the sodium carbonate is reacted with gypsum producing more calcium carbonate and sodium sulfate, thereby perpetuating the cycle. Potassium or lithium may be substituted for sodium in the reaction schemes described herein.

More specifically, with reference to FIG. 17, in an initial step a sodium carbonate solution is combined with a slurry or solution of gypsum. Gypsum is slightly water soluble, and the calcium ions in solution react with carbonate ions to form calcium carbonate, which is virtually insoluble in water, and sodium sulfate, which is highly soluble:

$$CaSO_4(aq) + Na_2CO_3(aq) \rightarrow CaCO_3(s) + Na_2SO_4(aq) \qquad 1.$$

The precipitation of calcium carbonate appears to drive more gypsum to dissolve, and the gypsum is quickly and nearly completely converted to calcium carbonate and sodium sulfate. The calcium carbonate is filtered, centrifuged or allowed to settle from solution and the remaining liquid is chilled to precipitate sodium sulfate. This sodium sulfate is then converted in electrochemical reactors to form acid, base, hydrogen and oxygen, and the base is then reacted with $CO_2$ to form new sodium carbonate:

$$3H_2O(l) + Na_2SO_4(aq) \rightarrow 2NaOH(aq) + H_2SO_4(aq) + H_2(g) + \tfrac{1}{2}O_2(g) \qquad 2.$$

$$2NaOH(aq) + CO_2(g) \rightarrow Na_2CO_3(aq) + H_2O(l) \qquad 3.$$

The net result of the above chemical pathway when combined with equation 1 is the conversion of natural or waste gypsum, water and $CO_2$ into useful products, including sulfuric acid, hydrogen, oxygen, and calcium carbonate.

Aside from the environmental benefits of $CO_2$ emission reductions, the present invention has numerous other environmental, economic and efficiency benefits, including beneficial use of waste or surplus gypsum, reduced demand for mined carbonates and synthetic acids, and reduced transportation costs due to onsite or local production of calcium carbonate for manufacturing. Given the vast amounts of waste $CO_2$ and abundant natural, synthetic and waste gypsum, the present invention represents an important new manufacturing pathway that economically converts waste gypsum and $CO_2$ into useful carbon reduced, neutral and negative products.

In an alternative embodiment of the present invention, a $CO_2$ conversion process could make use of natural minerals containing sodium carbonate, such as trona ore, to convert gypsum into calcium carbonate and sodium sulfate. In this embodiment, a natural mineral source of sodium carbonate is dissolved in aqueous solution, adjusted to a pH preferably in the range of 10.8 to 11.2 and then added to a slurry of gypsum. As a result of the double replacement reaction described above, calcium carbonate precipitates and sodium sulfate remains in solution. The precipitated calcium carbonate is separated and recovered from the solution. The remaining aqueous solution is chilled to precipitate sodium sulfate, which is isolated, purified and then subjected to electrochemical salt splitting to produce acid, base, hydrogen and oxygen. These can be combined with $CO_2$ negative carbonates to produce the value-added products described previously.

In another embodiment, aqueous solutions of sodium carbonate derived from mineral or synthetic sources, are reacted with alkaline earth sulfates in a double replacement reaction to generate sodium sulfate and alkaline earth carbonates. When alkaline earth sulfates are used, the resulting carbonates have minimal solubility in water. Hence, the precipitated carbonate is isolated from the aqueous solution, which is then chilled to precipitate and recover the sodium sulfate. The recovered sulfate salts can then be used as an electrochemical salt splitting reagent in the New Sky Process.

EXAMPLES

Some aspects of the present invention are further described in the following examples that are intended as illustrations only. Unless otherwise noted, all parts, percentages, and ratios reported in the following examples are on a weight basis, and all reagents used in the examples were commercially obtained or may be synthesized by conventional techniques.

Gypsum is slightly soluble in water (2-2.5 g/L). Empirical testing has shown that sodium chloride can significantly increase the solubility of gypsum in aqueous solution. Aqueous solutions of 5% to 15% sodium chloride can double the solubility of gypsum. An approximately 10% aqueous sodium chloride solution demonstrated optimal laboratory results, increasing the dissolved concentration of gypsum to 3%. In a series of related experiments, it was observed that 10% sodium chloride maximizes the precipitation of sodium sulfate from aqueous solutions upon chilling. These two observations work synergistically as described below.

In a first example, a sodium carbonate solution was added to a gypsum slurry with constant mixing. Equal or substantially equal moles of sodium carbonate and gypsum were combined. In a double replacement reaction mechanism, aqueous sodium sulfate and precipitated calcium carbonate are produced. The sodium sulfate, precipitated by chilling to generate the decahydrate salt ($Na_2SO_4.10H_2O$), serves as a reagent in an electrochemical salt splitter resulting in the production of oxygen, hydrogen, sulfuric acid and sodium hydroxide. The sodium hydroxide was further processed by contacting it with carbon dioxide from air or flue gas to produce sodium carbonate. The resulting sodium carbonate is reacted with fresh slurry of gypsum, thus perpetuating the cycle.

In a second example, sodium hydroxide is contacted with ambient air using bubble columns or fluid film contactors exposed to ambient or forced air flow. For contact with flue gas, wet scrubbers such as packed bed and Venturi scrubbers are preferred. Energy optimization of the integrated electrochemical and $CO_2$ contact systems results in production of a 10% aqueous sodium hydroxide solution, generating a sodium carbonate solution that may require concentration before reacting with gypsum. The sodium carbonate solution may be concentrated by evaporating the liquid, precipitating the sodium carbonate decahydrate by chilling, or a combination of both.

In a third example, gypsum was suspended as about a 25% slurry (mass to volume) in an aqueous solution of about 10% sodium chloride. A 25% sodium carbonate reagent in an aqueous solution of 10% sodium chloride was added slowly to the gypsum slurry with constant mixing. Equal or substantially equal moles of sodium carbonate and gypsum were combined. In a double replacement reaction, aqueous sodium sulfate and precipitated calcium carbonate are produced. The precipitated calcium carbonate product is physically separated from the sodium sulfate-sodium chloride solution. The pH of the sodium sulfate solution is adjusted to slightly basic and chilled below 5 C, thereby precipitating sodium sulfate decahydrate. The sodium sulfate decahydrate may serve as a reagent for the New Sky Process, resulting in the production of oxygen, hydrogen, sulfuric acid and sodium hydroxide. A sodium hydroxide solution of about 10% is further processed by contacting with carbon dioxide from air, flue gas or concentrate to produce sodium carbonate. The resulting sodium carbonate is concentrated to about 25%. Sodium chloride is added to about 10%. The 25% sodium carbonate in aqueous 10% sodium chloride is reacted with fresh slurry of gypsum, thus perpetuating the cycle. The entire process sequesters a greater amount of carbon dioxide than is produced, thus resulting in a carbon negative chemical cycle.

Additional processing embodiments for use with various aspects of the invention will now be discussed.

Figure 2:
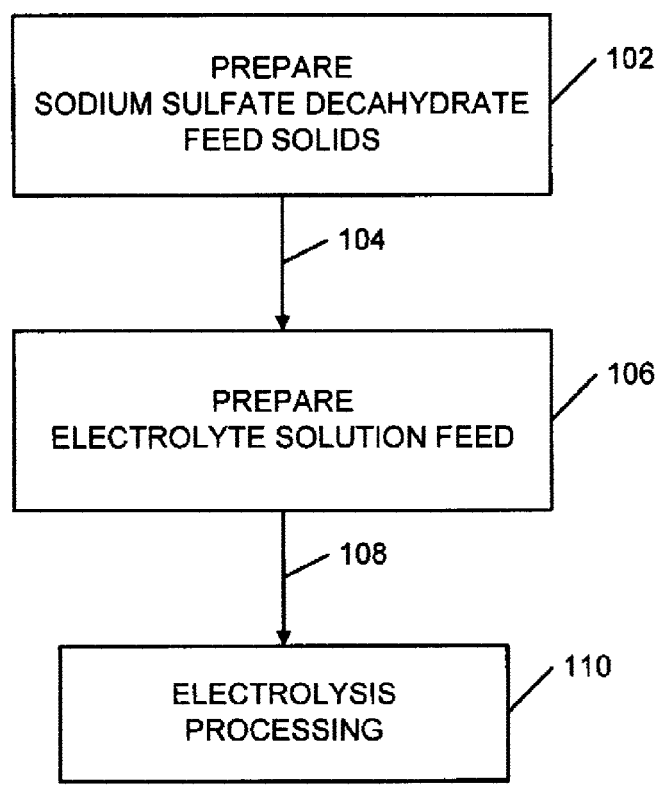
FIG. 2 is a general process block diagram of an embodiment of processing according to the invention.

FIG. 2 is a generalized process block diagram illustrating an embodiment processing according to of the invention. As shown in FIG. 2, the processing includes a step 102 to prepare sodium sulfate decahydrate feed solids. Feed solids 104 of sodium sulfate decahydrate from the step 102 are used in a step 106 to prepare electrolyte solution feed. Feed of electrolyte solution 108 prepared in the step 106 is used in a step of electrolysis processing 110.

The feed solids 104 of sodium sulfate decahydrate include precipitated sodium sulfate decahydrate that may be dissolved in water to prepare the feed of electrolyte solution 108 during the step 106. During the electrolysis processing 110 water of aqueous electrolyte solution is electrolyzed to generate hydronium ions at an anode and hydroxide anions at a cathode, for example, in one or more electrolytic cells.

The feed solids 104 are preferably substantially cleaned of residual impurities, and especially residual sodium chloride. Preferably, the feed solids 104 comprise at least 99.5 weight percent sodium sulfate decahydrate, more preferably at least 99.9 percent sodium sulfate decahydrate, even more preferably at least 99.99 percent sodium sulfate decahydrate, still more preferably at least 99.995 percent sodium sulfate decahydrate and most preferably at least 99.999 percent sodium sulfate decahydrate. The feed solids 104 preferably comprise no more than 500 ppm sodium chloride, more preferably nor more than 300 ppm sodium chloride, even more preferably no more than 100 ppm sodium chloride, still more preferably no more than 50 ppm sodium chloride and most preferably no more than 10 ppm sodium chloride. The feed of electrolyte solution 108 preferably contains no or only minute amounts of dissolved chlorides. Preferably the feed of electrolyte solution 108 includes a concentration of dissolved chloride that is no more than 100 milligrams per liter, preferably no more than 50 milligrams per liter, even more preferably no more than 20 milligrams per liter, still more preferably no more than 10 milligrams per liter and most preferably no more than 5 milligrams per liter. Particularly preferred is for the feed of the electrolyte solution 108 to include a concentration of dissolved chloride that is no larger than 1 milligram per liter.

The feed of electrolyte solution 108 preferably includes dissolved sodium sulfate at a concentration of at least 7 weight percent, at least 10 weight percent or even at least 15 weight percent. In some preferred embodiments, the concentration of dissolved sodium sulfate in the feed of the electrolyte solution 108 may be in a range having a lower limit of 7 weight percent, 10 weight percent or 15 weight percent and an upper limit of 33 weight percent or 25 weight percent. The feed of the electrolyte solution 108 may be a saturated, or nearly-saturated, sodium sulfate solution, which will vary in concentration of sodium sulfate as a function of temperature.

During the electrolysis processing 110, a variety of products may be produced. For example, products prepared during the electrolysis processing 110 may include one or more of sodium hydroxide, acidic sulfate material (e.g., sulfuric acid, sodium bisulfate), hydrogen gas and oxygen gas, as discussed further below. Such products may be produced, for example, through electrolyzing water to generate hydronium ions and hydrogen gas at an anode and to generate hydroxide ions and oxygen gas at a cathode, and through salt splitting of dissolved sodium cations and sulfate anions.

The step 102 to prepare sodium sulfate decahydrate feed solids may involve precipitating sodium sulfate decahydrate from an aqueous salt solution. The precipitating may be followed by liquid-solid separation to separate precipitated sodium sulfate decahydrate from the remaining aqueous salt solution following the precipitation. The step 102 may further include one or more reprecipitation cycles or other purification steps following an initial precipitation of sodium sulfate decahydrate. Such other purification steps may include, for example, dissolving the sodium sulfate decahydrate in water and then removing unwanted ions using ion exchange or affinity techniques, chemical precipitation of multivalent cations and/or physical techniques such as electro-coagulation. Following such removal of multivalent cations, sodium sulfate decahydrate may be reprecipitated by reducing the temperature of the solution.

Figure 3:
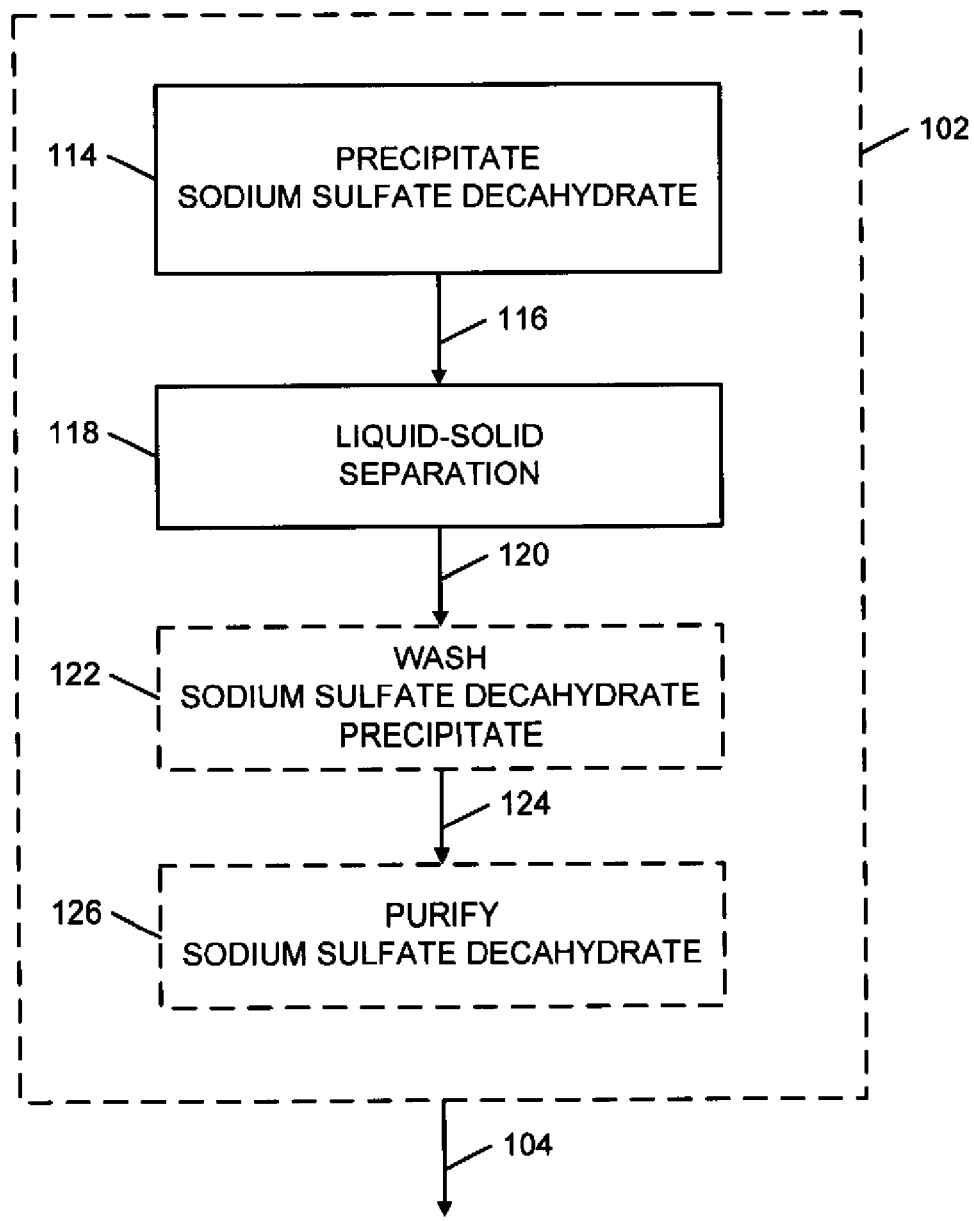
FIG. 3 is a general process block diagram of an embodiment of processing according to the invention.

Reference is now made to FIG. 3, including a generalized process block diagram illustrating an embodiment of possible processing during the step 102 of FIG. 2 to prepare sodium sulfate decahydrate feed solids 104. As shown in FIG. 3, the step 102 includes a step 114 to precipitate sodium sulfate decahydrate. A resulting mixture 116 including sodium sulfate decahydrate precipitate and remaining aqueous salt solution is subjected to liquid-solid separation 118 to remove most of the aqueous salt solution from the sodium sulfate decahydrate. Separated sodium sulfate decahydrate precipitate 120 may then optionally be subjected to a step 122 to wash the sodium sulfate decahydrate precipitate 120 with a clean aqueous wash liquid to prepare washed sulfate decahydrate precipitate 124, which may then optionally be subjected to a further step 124 to further purify the sodium sulfate decahydrate. The wash liquid may preferably be a cold, clean, saturated or nearly saturated sodium sulfate solution.

With continued reference to FIG. 3, precipitation of the sodium sulfate decahydrate during the step 114 is preferably carried out in a manner to selectively precipitate sodium sulfate decahydrate while not precipitating significant amounts of contaminants, and in particular to not precipitate a significant quantity of sodium chloride. In some preferred embodiments, precipitate of sodium sulfate decahydrate is accomplished by reducing the temperature of the aqueous salt solution containing dissolved sodium sulfate to cause selective precipitation of sodium sulfate decahydrate relative to sodium chloride. In some embodiments, the temperature of the aqueous salt solution immediately before precipitation may be at a higher first temperature, for example a temperature of at least 20° C., more preferably at least 25° C. and even more preferably at least 30° C. Immediately before precipitating the sodium sulfate decahydrate, the aqueous salt solution may often be at a temperature no greater than 40° C., and preferably no greater than 35° C. Particularly preferred is for the aqueous salt solution to be at a temperature in a range of from 30° C. to 33° C. immediately prior to precipitation of sodium sulfate decahydrate. To precipitate the sodium sulfate decahydrate, the temperature of the aqueous salt solution containing dissolved sodium sulfate is reduced to a second lower temperature that is preferably 10° C. or lower, more preferably at least 7° C. or lower, and even more preferably 5° C. or lower. Preferably, the temperature of the salt solution is not reduced to below minus 10° C., more preferably not below minus 5° C. and even more preferably not below 0° C. In some preferred embodiments, the temperature of the salt solution is reduced to a temperature in a range of from 0° C. to 5° C. In some preferred embodiments, after the temperature of the aqueous salt solution is reduced, the temperature is maintained for some period of time at a temperature of 10° C. or lower, preferably 7° C. or lower and more preferably 5° C. or lower, and often at a temperature of minus 10° C. or higher, preferably minus 5° C. or higher, and even more preferably 0° C. or higher. The aqueous salt solution may be maintained at such a reduced temperature for a period of time of at least 10 minutes, preferably at least 15 minutes and more preferably at least 20 minutes. Maintaining the temperature at a reduced level for such a period of time promotes a high level of precipitation and crystal growth of the sodium sulfate decahydrate.

With continued reference to FIG. 3, a feed of aqueous salt solution to the step 102 may include dissolved sodium-containing sulfate material, such as dissolved sodium sulfate, dissolved sodium bisulfate or combinations thereof, and preferably the sodium-containing sulfate material may be mostly or substantially all comprised of dissolved sodium sulfate. A feed of the aqueous salt solution subjected to the step 114 to precipitate sodium sulfate decahydrate may preferably include a concentration of the dissolved sodium-containing sulfate material of at least 5 weight percent, more preferably at least 10 weight percent and even more preferably at least 15 weight percent. In some preferred embodiments, a feed of the aqueous salt solution to the step 114 may include dissolved sodium sulfate of a concentration in a range having a lower limit of 5 weight percent, 10 weight percent or 15 weight percent and an upper limit of 20 weight percent, 25 weight percent or 30 weight percent. As will be appreciated, the maximum solubility of sodium sulfate in water is approximately 33.2 weight percent at a temperature of 32.38° C. As the temperature of a sodium sulfate solution is reduced below 32.38° C., the solubility of sodium sulfate drops quickly to below 5 weight percent at 0° C. A significant advantage with the invention is that sodium sulfate decahydrate may be selectively precipitated with a high degree of purity and without precipitation of a significant quantity of sodium chloride. This permits significant flexibility to process salt solution feeds of a variety of compositions and from a variety of sources.

With continued reference to FIG. 3, a feed of the aqueous salt solution to the step 102, or to the step 114, need not be from a purified water source. Rather, in some embodiments, a feed of aqueous salt solution may contain amounts of dissolved sodium chloride found in municipal water systems or may contain even larger concentrations of dissolved sodium chloride. In some embodiments, the feed of the aqueous salt solution may contain dissolved chloride at a concentration of at least 100 milligrams per liter, at least 200 milligrams per liter, at least 300 milligrams per liter, or at least 500 milligrams per liter or more. By concentration of dissolved chloride, it is meant the concentration of the chloride ion, and not of the dissolved chloride salt. In some embodiments, a high concentration of dissolved sodium chloride may beneficially help to "push" sodium sulfate out of solution and promote efficient precipitation of sodium sulfate decahydrate. In some embodiments, the feed of the aqueous salt solution may be a mixed salt solution comprising dissolved sulfate and chloride salts. In some embodiments such a mixed salt solution may contain dissolved sodium chloride at a concentration in a range having a lower limit of 3 weight percent, 5 weight percent or 7 weight percent and an upper limit of 20 weight percent, 10 weight percent or 7 weight percent of sodium chloride. In some preferred embodiments, such a mixed salt solution feed to the step 102 includes sodium sulfate at a concentration in a range having a lower limit of 4 weight percent, 5 weight percent or 7 weight percent and an upper limit of 15 weight percent, 18 weight percent or 20 weight percent. Typically, no significant quantities of sodium chloride will precipitate during the step 114, and the concentration of dissolved sodium chloride in the aqueous salt solution will stay at a high level from the beginning of the precipitating through the end of the precipitating of the sodium sulfate decahydrate. In fact, because of the loss of water from the aqueous salt solution to provide the bound water in sodium sulfate decahydrate, the concentration of dissolved sodium chloride may significantly increase during the process of precipitating sodium sulfate decahydrate. In some embodiments, a quantity of sodium sulfate decahydrate precipitated per liter of the aqueous salt solution may be at least 100 grams, at least 150 grams, at least 200 grams or even at least 300 grams.

With continued reference to FIG. 3, the step 118 of liquid-solid separation may include any suitable liquid-solid separation technique, for example, decantation, centrifuging, screening or filtration. The step 122 to wash sodium sulfate decahydrate precipitate may involve contacting the separated sodium sulfate decahydrate precipitate 120 with a sufficient quantity of clean aqueous wash liquid, preferably cold, high purity water saturated or nearly saturated with clean sodium sulfate, to wash residual contaminants from sodium sulfate decahydrate crystals. The wash liquid may, for example, be or may be made distilled water or purified water obtained from membrane purification techniques, for example reverse osmosis purification. The wash liquid may be at a temperature of 10° C. or lower, preferably 5° C. or lower and more preferably 0° C. or lower. The wash liquid may often be at a temperature of not lower than minus 10° C., or not lower than minus 5° C. In particular, the wash liquid should contain very little if any dissolved sodium chloride. Preferably, the wash liquid contains a chloride concentration of no more than 100 milligrams per liter, more preferably no more than 50 milligrams per liter and even more preferably no more than 10 milligrams per liter. The steps 114, 118, 122 and 124 may be performed in a single vessel or different processing may be performed in different vessels. An example of processing in a single vessel is discussed below with reference to FIGS. 18 and 21. During step 124 to further purify the sodium sulfate decahydrate, the sodium sulfate decahydrate may be subjected to further processing to reduce the level of contaminants to an even lower level, if desired. Such step 124 may include, for example, redissolving the sodium sulfate decahydrate (preferably using a high-purity water such as described for use to prepare the wash liquid) and processing the redissolved solution, such as using selective ion removal of contaminants (e.g., using a complexing agent or ion exchange resin) and/or reprecipitating sodium sulfate decahydrate.

Figure 4:
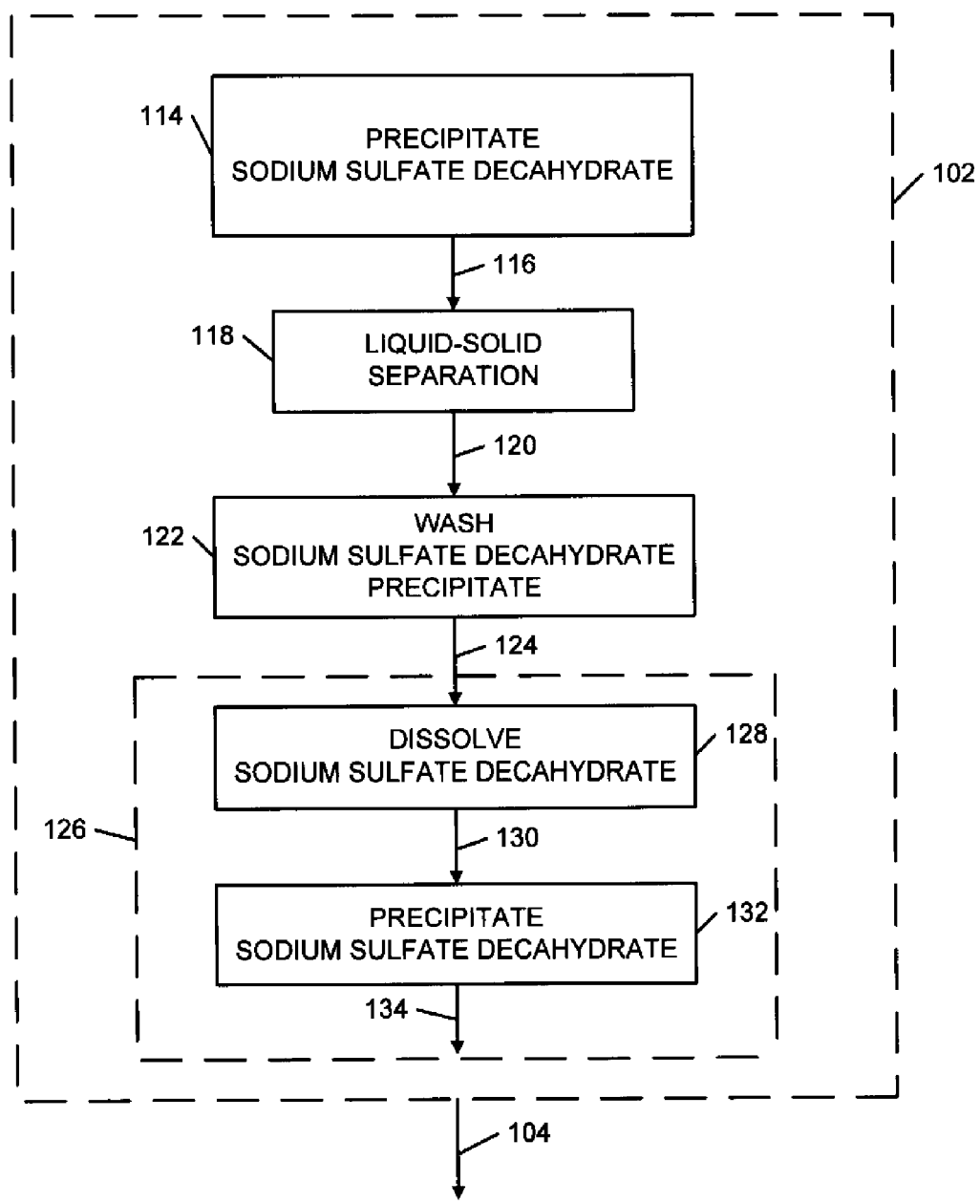
FIG. 4 is a general process block diagram of an embodiment of processing according to the invention.

Reference is now made to FIG. 4, which includes a generalized process block diagram illustrating an embodiment of possible processing during the step 102 within the more general processing embodiment of FIG. 3. As shown in FIG. 4, the processing of step 126 includes a step 128 to dissolve sodium sulfate decahydrate and prepare a solution 130 which is then subjected to a step 132 to precipitate sodium sulfate decahydrate to prepare reprecipitated sodium sulfate decahydrate 134, which may be used as or further processed to prepare the solids feed 104 of sodium sulfate decahydrate. In some implementations, the precipitation of sodium sulfate decahydrate during the step 114, and also during the step 132, may be performed at a natural pH. In some preferred implementations, however, precipitation of sodium sulfate decahydrate in step 114 and/or step 132 is performed at a slightly basic pH in a range having a lower limit of pH 7.5, pH 7.8 or pH 8.0 and having an upper limit of pH 9.5, pH 9.0, pH 8.8 or pH 8.5.

The precipitation of sodium sulfate decahydrate during the step 132 may be performed substantially as described previously for the step 114, except that the salt solution 130 is preferably does not contain significant amounts of dissolved chloride. In some embodiments, the concentration of dissolved chloride in the salt solution 130 will be smaller than 200 milligrams per liter, preferably smaller than 100 milligrams per liter, even more preferably smaller than 50 milligrams per liter and even more preferably smaller than 25 milligrams per liter. Assuming that the salt solution 130 contains no significant quantities of dissolved chloride, it may be possible to forego a post precipitation wash of the reprecipitated sodium sulfate decahydrate precipitate 134. Rather, it may be sufficient to simply perform a liquid-solid separation to separate remaining salt solution from the reprecipitated sodium sulfate decahydrate precipitate 134 to prepare the solids feed 104 of the sodium sulfate decahydrate.

With continued reference to FIG. 4, the step 128 to dissolve sodium sulfate decahydrate may include contacting the washed sodium sulfate decahydrate precipitate 124 with a warm aqueous liquid so that the salt solution may be at a temperature of at least 25° C. and preferably at least 30° C. The salt solution 130 will be at a temperature preferably of at least 20° C., more preferably at least 25° C. and even more preferably at least 30° C. when provided to the step 132, where the temperature of the salt solution 130 will typically be reduced to cause precipitation of sodium sulfate decahydrate, in a manner as previously described. The salt solution 130 may be at a temperature at which the solution is saturated in dissolved sodium sulfate at the concentration of sodium sulfate contained in the salt solution 130. Because the washed sodium sulfate decahydrate precipitate 124 may be at a reduced temperature (e.g., less than 10° C.), the clean aqueous liquid used to dissolve sodium sulfate decahydrate in step 128 may be at a significantly higher temperature than the final temperature desired for the salt solution 130. For example, during the step 122 the wash liquid may typically be at a reduced temperature consistent with the reduced temperature for precipitation described with respect to the step 114, or at an even lower temperature. The wash liquid used in the step 122, may, for example, be at a temperature of 10° C. or lower, 7° C. or lower or even 5° C. or lower. The wash liquid may often be at a temperature of at least or at least minus 10° C., at least minus 5° C., or at least 0° C. Prior to the step 128, sodium sulfate decahydrate precipitate resulting from step 114 may be maintained at a temperature consistent with the temperatures described above with respect to the reduced temperature for precipitation until contacted with warm aqueous liquid in step 128 to dissolve the sodium sulfate decahydrate. To compensate for the reduced temperature of the washed sodium sulfate decahydrate precipitate, the aqueous liquid used in step 128 to dissolve sodium sulfate decahydrate may be at a temperature of at least 35° C., at least 40° C., at least 45° C. or at least 50° C. Often, the clean aqueous liquid will be at a temperature not greater than 80° C., not greater than 70° C. or not greater than 60° C. Preferably, the salt solution 130 has a concentration of dissolved sodium sulfate in a range as previously described with respect to feed of the aqueous salt solution to the step 102, or to the step 114, discussed previously.

Figure 5:
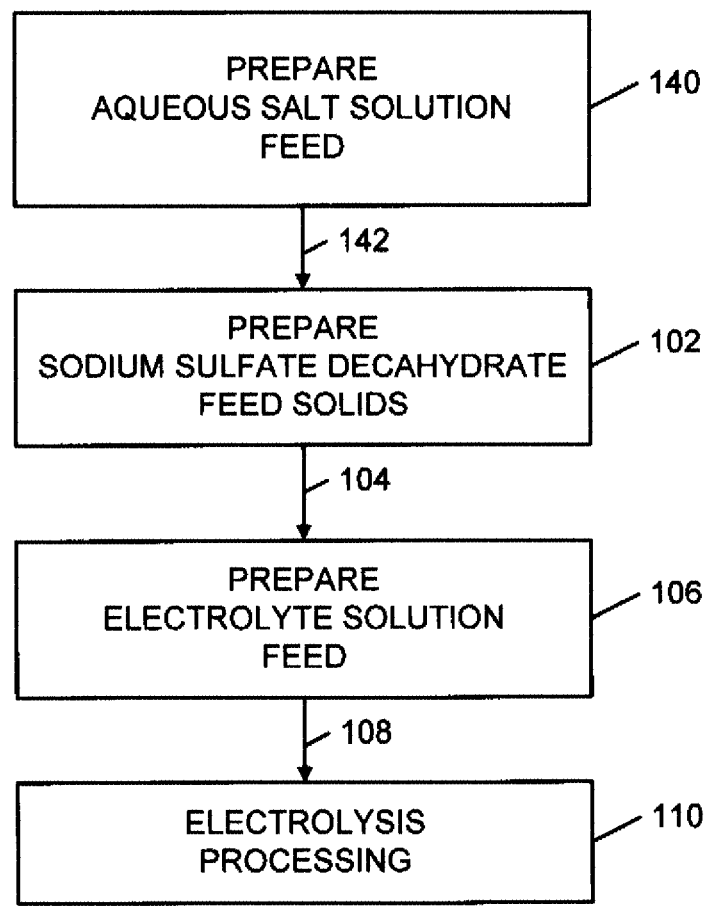
FIG. 5 is a general process block diagram of an embodiment of processing according to the invention.

Reference is now made to FIG. 5, including a generalized process block diagram illustrating a processing embodiment of the invention. Processing shown in FIG. 5 is the same as shown in FIG. 2, except including a preliminary step 140 to prepare aqueous salt solution feed. A resulting salt solution 142 is provided to the step 102 to prepare sodium sulfate decahydrate feed solids. As noted previously, one significant advantage with the present invention is that a variety of feed sources may be used to provide sodium sulfate for preparing the feed solids 104 of sodium sulfate decahydrate. For example, initial sodium sulfate feed for the step 140 may be provided by a solid sodium sulfate salt product. Because of the purification that occurs during precipitation of sodium sulfate decahydrate during the step 102, such a solid sodium sulfate salt product may be a crude product containing significant levels of contaminants, that would not otherwise be suitable feed for preparing the feed of electrolyte solution 108. Alternatively, an initial source of sodium sulfate may be provided in a brine solution, which may be a mixed salt solution including significant concentrations of both dissolved sodium sulfate and sodium chloride. Such brine solutions may, for example, be sourced from agricultural drainage water, surface water drainage, ground water or produced water associated with oil or gas production. FIGS. 6-10 will be used to illustrate some example processing embodiments that may be performed during the step 140 to prepare the feed of aqueous salt solution 108.

Figure 6:
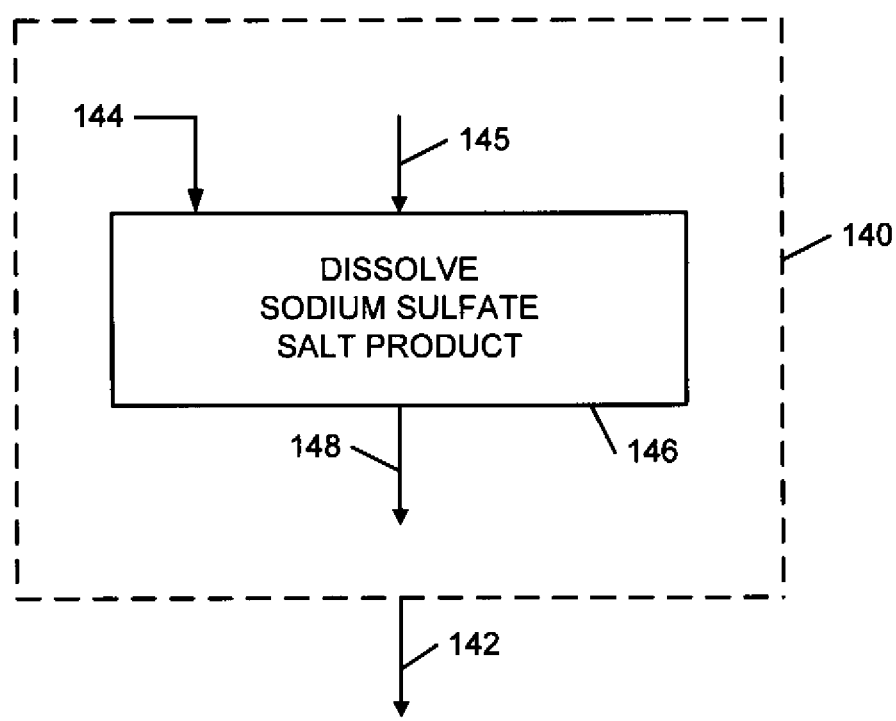
FIG. 6 is a general process block diagram of an embodiment of processing according to the invention.

Referring now to FIG. 6, a generalized process block diagram is shown illustrating one example embodiment for processing during the step 140. As shown in FIG. 6, a solid sodium sulfate salt product 144 and aqueous liquid 145 may be processed in a step 146 to dissolve the sodium sulfate salt product 144 and prepare a solution 148 containing dissolved sodium sulfate from the solid sodium sulfate salt product 144. The solution 148 may be used as the feed of the salt solution 142 or may be further processed to prepare the feed of the salt solution 142. For example, the solution 148 may be subjected to selective ion removal processing to remove multivalent cations (e.g., calcium or magnesium ions) or may be subjected to pH adjustment as desired, prior to being provided as the feed of salt solution 142 to the step 102 (e.g., FIG. 5). The sodium sulfate salt product 144 need not be of high purity. In some embodiments, the solid sodium sulfate salt product 144 may be a commercial or industrial grade anhydrous sodium sulfate product. In some embodiments, the solid sodium sulfate salt product may comprise at least 500 ppm by weight of sodium chloride, or even 1000 ppm by weight or more of sodium chloride.

Figure 7:
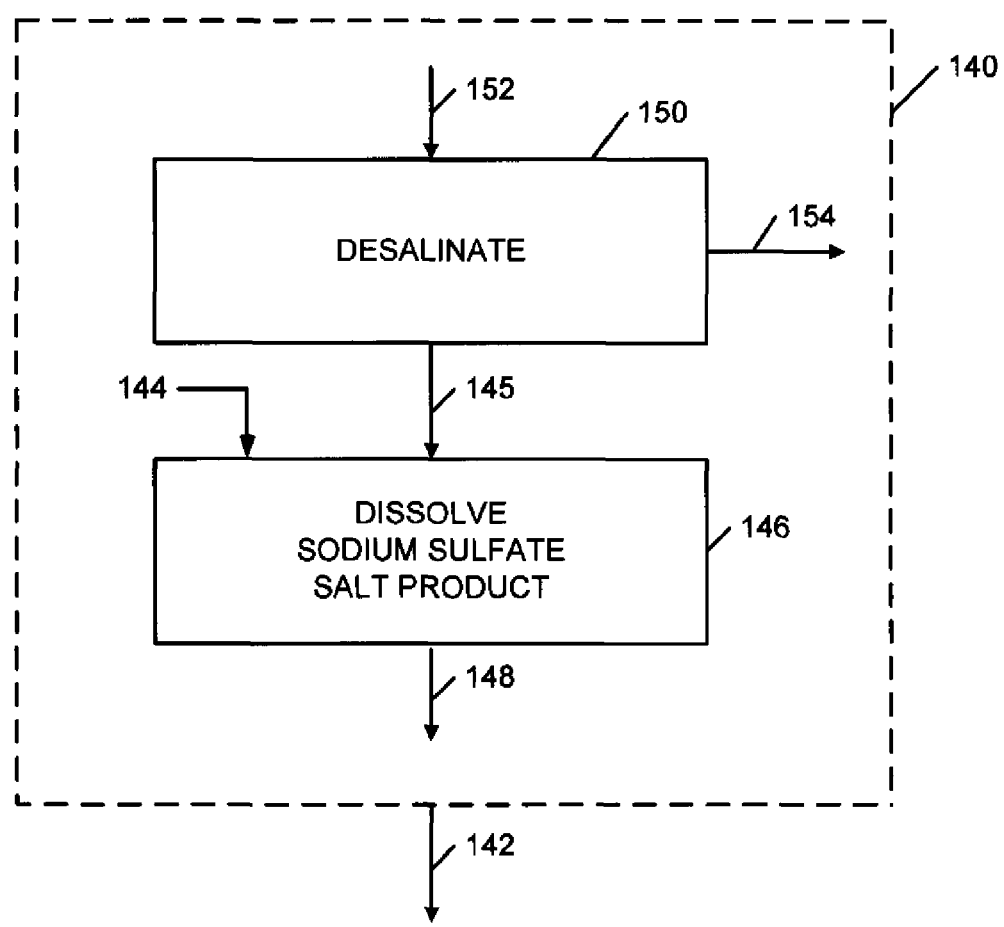
FIG. 7 is a general process block diagram of an embodiment of processing according to the invention.

Reference is now made to FIG. 7, including a general process block diagram illustrating another example processing embodiment for the step 140 to prepare the feed of salt solution 142. FIG. 7 is the same as FIG. 6, except including a step 150 to desalinate an aqueous salt-containing feed liquid 152 to prepare a desalinated liquid 154 containing a lower level of total dissolved solids then the salt-containing feed liquid 152 and to prepare the aqueous liquid 145 containing a higher level of total dissolved solids than the salt-containing feed liquid 152. The desalinated liquid 154 may be purified water that may be used in the process where high purity water is desirable, or may be used for other purposes. The salt-containing feed liquid 152 may be from a relatively clean water source (e.g., such as municipal water, treated process water or low salinity ground water or surface water) or may be a lower-grade aqueous liquid, such as high-salinity or brine solution (e.g., agricultural drainage water, high-salinity ground water or surface water, industrial waste water, or produced water from hydrocarbon production operations). The desalinated liquid 154 may be high purity water that may be beneficially used in the processing of the invention, for example, to prepare wash liquid in the wash step 122 (FIGS. 3 and 4) or to prepare the feed of electrolyte solution 108 for use in electrolysis processing 110 (e.g., FIGS. 2 and 5).

Figure 8:
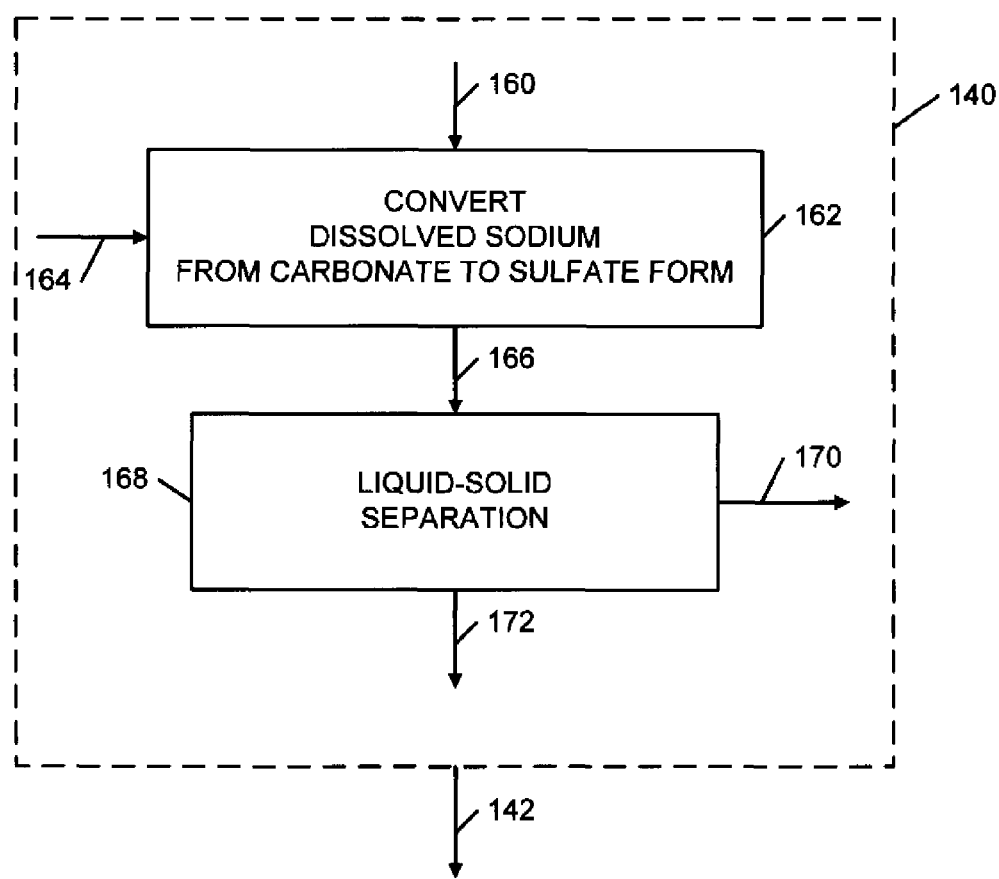
FIG. 8 is a general process block diagram of an embodiment of processing according to the invention.

Reference is now made to FIG. 8, including a general process block diagram illustrating an example embodiment of processing that may be performed during the step 140. As shown in FIG. 8, a carbonate-containing salt solution 160 is processed in a step 162 to convert dissolved sodium in the solution from carbonate to sulfate form. During the step 162, the carbonate-containing salt solution 160 is contacted with a calcium sulfate reagent 164 to precipitate calcium carbonate and form dissolved sodium-containing sulfate material (e.g., sodium sulfate and/or sodium bisulfate). A resulting mixture 166 containing precipitated calcium carbonate and dissolved sodium-containing sulfate material is then processed in a liquid-solid separation step 168 to separate precipitated calcium carbonate solids 170 from a salt solution 172 containing the dissolved sodium-containing sulfate material. The salt solution 172 may be used as or further processed to prepare the feed of salt solution 142. The carbonate-containing salt solution 160 includes a dissolved sodium-containing carbonate material (e.g., sodium carbonate and/or sodium bicarbonate). In some embodiments, the carbonate-containing salt solution 160 may result from carbon dioxide capture operations according to some embodiments of the invention. In such a situation the processing as shown in FIG. 8 may advantageously regenerate sodium-containing sulfate material for further processing, while sequestering carbon dioxide in the precipitated calcium carbonate. In other embodiments, the carbonate-containing salt solution 160 may be prepared by dissolving sodium-containing carbonate reagent material in aqueous liquid for the purpose of the processing shown in FIG. 8, without regeneration of sodium-containing sulfate material previously processed through a processing of the invention to capture carbon dioxide. Calcium carbonate is significantly more stable in solution than sodium carbonate or sodium bicarbonate, and the displacement reaction to displace the dissolved carbonate with a dissolved sulfate readily takes place. The step 162 may be performed at any convenient conditions, such as for example at a temperature in a range of from 5° C. to 35° C. and at a pH in a range of from pH 5 to pH 9. The calcium sulfate reagent 164 may include calcium sulfate in solution in an aqueous liquid or calcium sulfate in solid particulate form, or may include a slurry of aqueous liquid containing some calcium sulfate in solution and some solid particulate calcium sulfate slurried with liquid. When the calcium sulfate reagent 164 includes solid particulate calcium sulfate material, as dissolved calcium sulfate is converted to sodium-containing sulfate material, additional calcium carbonate will dissolve to provide additional calcium sulfate in solution for further reaction with dissolved sodium-containing carbonate material to continue to convert the sodium-containing carbonate material to sodium-containing sulfate material. The calcium sulfate in the calcium sulfate reagent 164 may be provided from any convenient source. For example, the calcium sulfate reagent 164 may include calcium sulfate from mined mineral material (e.g., mined gypsum), or may include synthetic calcium sulfate material, (e.g., waste calcium sulfate generated by industry). One advantageous feed for calcium sulfate for the calcium sulfate reagent 164 is waste gypsum generated from flue gas desulfurization operations.

Figure 9:
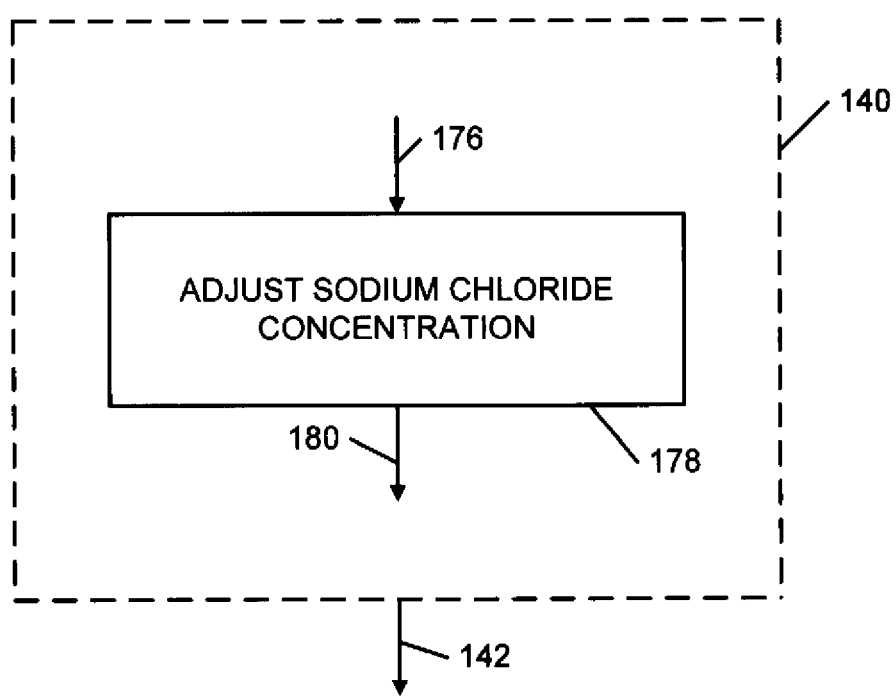
FIG. 9 is a general process block diagram of an embodiment of processing according to the invention.

Reference is now made to FIG. 9, which includes a generalized process block diagram illustrating an embodiment of possible processing that may be performed during the step 140. As shown in FIG. 9, an aqueous solution 176 containing dissolved sodium-containing sulfate material, and preferably dissolved sodium sulfate, is subjected to a processing step 178 to adjust the concentration of sodium chloride within the solution to prepare a mixed salt solution 180 containing dissolved sulfate and chloride salts at desired concentrations. The mixed salt solution 180 may be used as or further processed to prepare the feed of salt solution 142. The concentration of sodium chloride in the mixed salt solution 180 may be at any level as described elsewhere in relation to embodiments for the feed of salt solution 142.

Figure 10:
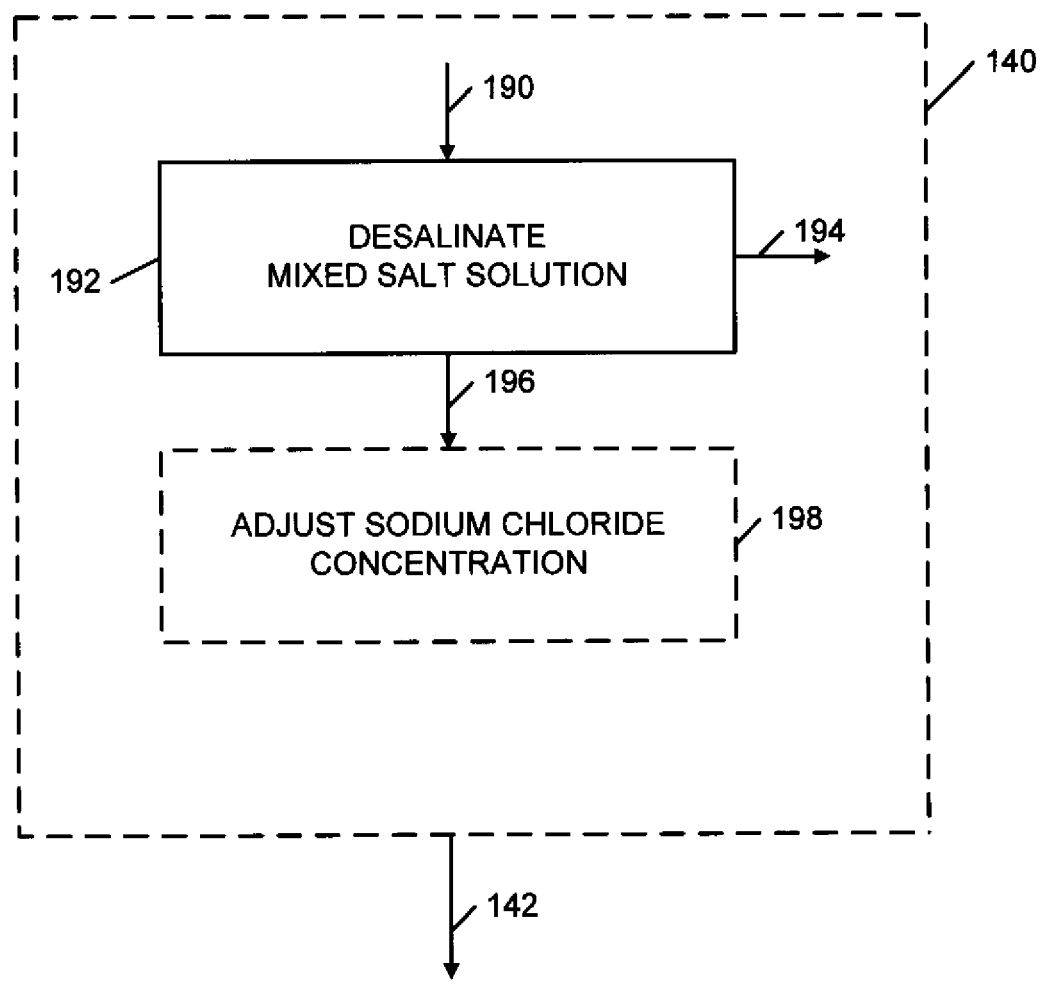
FIG. 10 is a general process block diagram of an embodiment of processing according to the invention.

Reference is now made to FIG. 10, which includes a generalized process block diagram illustrating yet another example embodiment of possible processing that may be performed during the step 140. As shown in FIG. 10, a mixed salt-containing feed liquid 190 is subjected to a processing step 192 to desalinate the mixed salt-containing feed liquid, resulting in preparation of a clean, desalinated liquid 194 and a mixed salt-containing concentrate liquid 196. The desalinated liquid 194 will have a lower total dissolved solids content than the mixed salt-containing feed liquid 190. The concentrate liquid 194 will have a higher, and often a substantially higher, concentration of total dissolved solids than the mixed salt-containing feed liquid 190. Desalination during the step 192 may be performed by any technique, such as distillation or membrane purification (e.g., reverse osmosis). The mixed salt concentrate liquid 196 may be used as or further processed to prepare the feed salt solution 142. As shown in FIG. 10, the concentrate liquid 196 may be further processed in an optional step 198 to adjust the concentration of dissolved sodium chloride, typically by increasing the concentration by adding additional sodium chloride to the concentrate liquid 196. The sodium chloride concentration may be adjusted, for example, to any concentration as discussed elsewhere in relation to the feed of salt solution 142.

With continued reference to FIG. 10, the mixed salt-containing feed liquid 190 may advantageously be sourced from a variety of sources, such as from agricultural drainage, high salinity ground water or surface water, industrial waste water or produced water from production of hydrocarbons (e.g., oil or natural gas production). The mixed salt-containing feed liquid 190 may contain a high level of total dissolved solids, also referred to interchangeably herein as total dissolved salt. The total dissolved solids content of the mixed salt-containing feed liquid 190 may, for example, be at least 1000 ppm, at least 3000 ppm or even at least 5000 ppm. The mixed salt-containing liquid feed 190 should have a significant amount of dissolved sodium sulfate, preferably at least 500 ppm by weight dissolved sodium sulfate and more preferably at least 1000 ppm by weight dissolved sodium sulfate. The mixed salt-containing feed liquid 190 may also contain a significant concentration of dissolved sodium chloride, which may be at a concentration lower than or higher than the concentration of dissolved sodium sulfate. The concentrate liquid 196 should be significantly more concentrated in dissolved sodium sulfate and dissolved sodium chloride than the mixed salt-containing feed liquid 190. Preferably, the mixed salt concentrate liquid 196 includes a concentration of dissolved sodium sulfate of at least 5 weight percent. For example, the concentrate liquid 196 may include a concentration of dissolved sodium sulfate in any amount as described elsewhere herein in relation to the feed of salt solution 142. In some implementations, when the sodium chloride concentration in the mixed salt concentrate liquid 196 is between about 1 weight percent and 5 weight percent, it may be particularly preferred to include the step 198 to adjust the sodium chloride concentration to a level of at least 5 weight percent, or to any other level as described elsewhere herein in relation to the feed of salt solution 142.

Referring again to FIGS. 2 and 5, during the step 106 to prepare electrolyte solution feed, the feed solids 104 of the sodium sulfate decahydrate may be dissolved in water to provide a desired concentration of dissolved sodium sulfate. The resulting feed of electrolyte solution 108 is preferably at a temperature of at least 20° C., more preferably at least 25° C., even more preferably at least 30° C. In a particularly preferred implementation, the temperature of the resulting feed of electrolyte solution 108 is at a temperature of from 30° C. to 35° C. Because the feed solids 104 of the sodium sulfate decahydrate may be at a reduced temperature (e.g., less than 10° C.) the temperature of water provided for dissolving the feed solids 104 may be significantly warmer than the desired ultimate temperature of the feed of the electrolyte solution. The temperature of the water as provided for dissolving the feed solids may in some embodiments be at least 30° C. least 35° C., at least 40° C., at least 45° C., at least 50° C. In many embodiments, the water will not be at a temperature higher than 90° C., and preferably not higher than 80° C. Any desired amount of sodium sulfate decahydrate of the feed solids 104 may be dissolved in the water as desired to prepare the feed of electrolyte solution 108 having a desired concentration of dissolved sodium sulfate. In most situations, at least 200 grams of sodium sulfate decahydrate will be dissolved per liter of water. The feed of the electrolyte solution 108 may be prepared to contain any desired level of dissolved sodium-containing sulfate material, such as sodium sulfate, sodium bisulfate or combinations thereof. Preferably, the feed of the electrolyte solution 108 is prepared to contain all or mostly all dissolved sodium in the form of dissolved sodium sulfate. In some embodiments, the feed of electrolyte solution 108 will have a concentration of dissolved sodium sulfate in a range having a lower limit of 7 weight percent, 10 weight percent, 15 weight percent or 20 weight percent and having an upper limit of 33 weight percent, 30 weight percent or 25 weight percent. As will be appreciated, because of the bound water content within the sodium sulfate decahydrate of the feed solids 104, a significantly larger mass of sodium sulfate decahydrate will need to be dissolved per liter of water to provide the desired concentration by weight of sodium sulfate. This is due both to the weight of the bound water in the sodium sulfate decahydrate and the dilution effect upon the release of the bound water into the solution. The feed of electrolyte solution 108 should preferably contain very little if any dissolved chloride, to help reduce or prevent generation of chlorine during the electrolysis processing 110. In some preferred embodiments, the feed of electrolyte solution 108 comprises a concentration of dissolved chloride of no more than 100 milligrams per liter, preferably no more than 50 milligrams per liter, more preferably no more than 25 milligrams per liter, still more preferably no more than 10 milligrams per liter and most preferably no more than 1 milligram per liter. In some embodiments, the water used to dissolve the sodium sulfate decahydrate during the step 106 will be a purified water that has been treated to remove dissolved solids, and particularly to remove dissolved chlorides, calcium and magnesium. The water may, for example, be purified water prepared by distillation or membrane purification (e.g., reverse osmosis). In some embodiments, the purified water provided to the step 106 may have a concentration of dissolved chloride as previously described elsewhere herein in relation to the feed of electrolyte solution 108.

Figure 11:
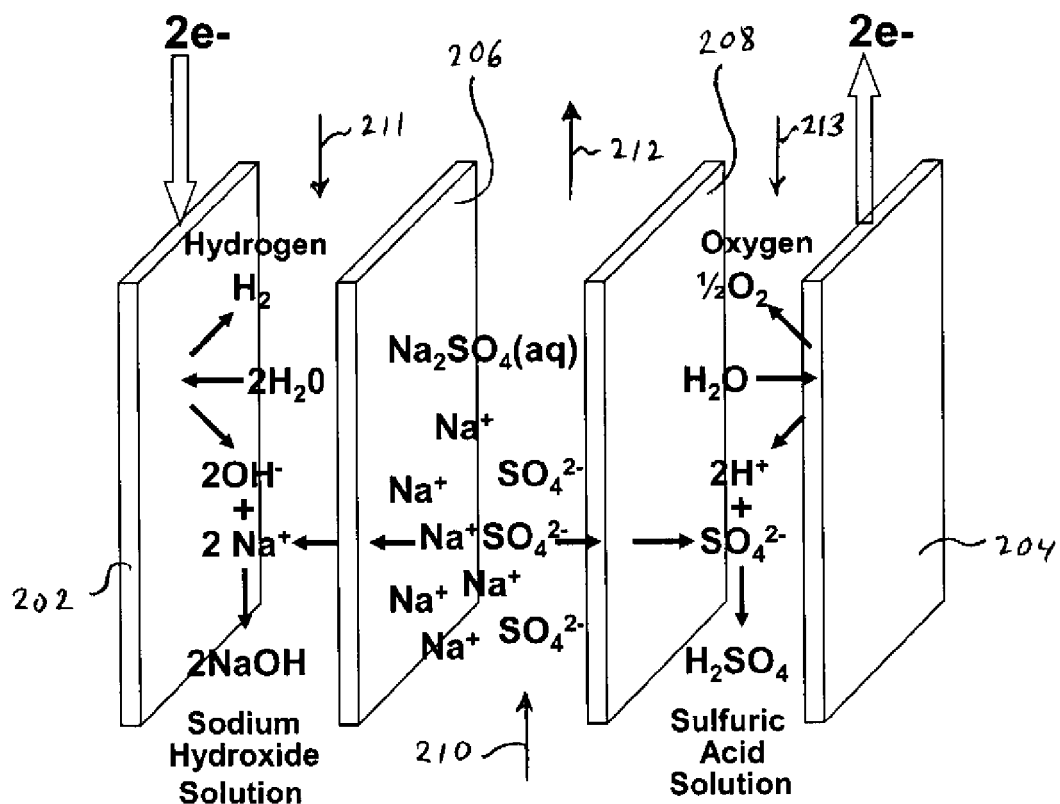
FIG. 11 is an illustration of an embodiment of an electrolysis cell configuration for use in an electrolysis reactor for use with processing of the invention.
Figure 12:
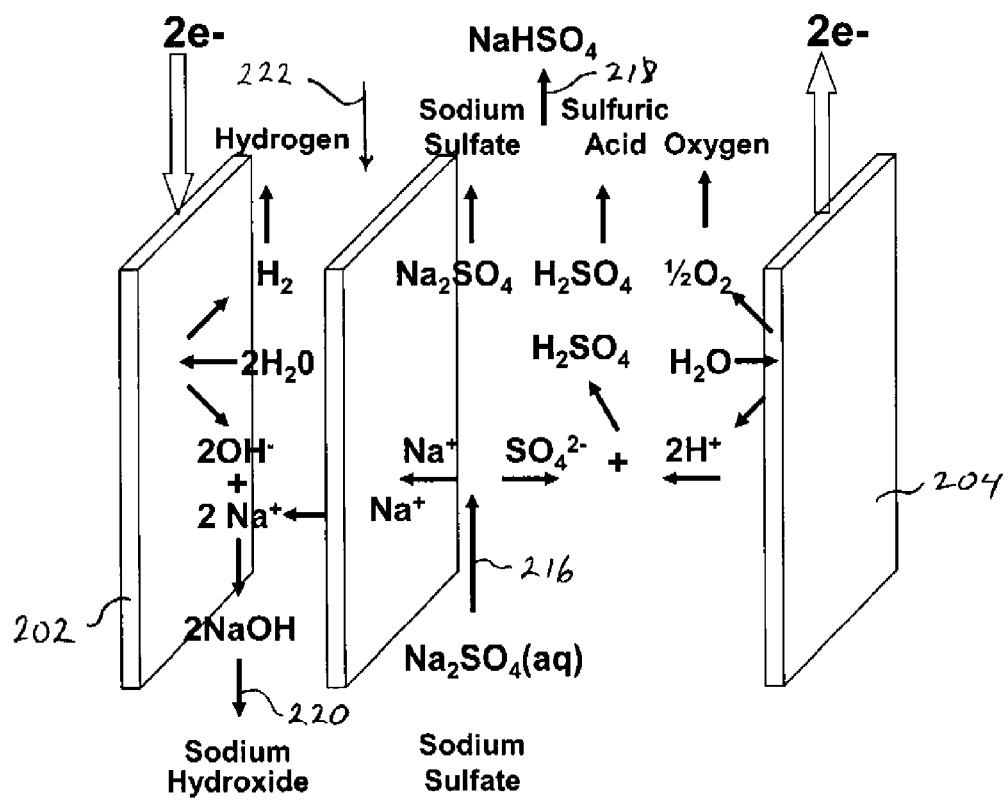
FIG. 12 is an illustration of an embodiment of an electrolysis cell configuration for use in an electrolysis reactor for use with processing of the invention.
Figure 13:
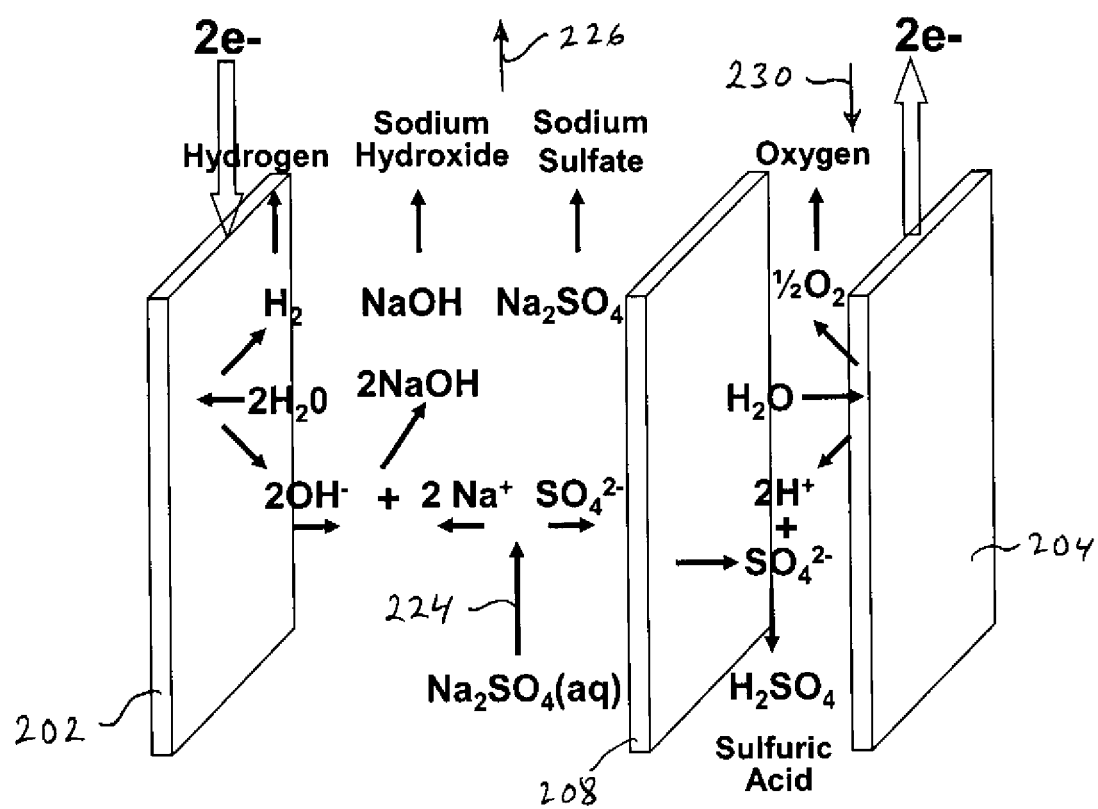
FIG. 13 is an illustration of an embodiment of an electrolysis cell configuration for use in an electrolysis reactor for use with processing of the invention.

With continued reference to FIGS. 2 and 5, the electrolysis processing 110 includes electrolyzing water of an aqueous electrolyte solution to generate hydronium ions at an anode and hydroxide ions at a cathode. Direct current electrical power will typically be applied between the anode and cathode to cause the water to electrolyze and will also typically cause salt splitting of sodium and sulfate ions, with sodium cations tending to migrate toward the cathode and sulfate anions tending to migrate toward the anode. The anode and cathode will typically be part of a electrolysis reactor which may include multiple electrolytic cells, with each cell including a cathode and anode pair. The electrolysis cell configuration may be of any desired design, and may include ion-specific or nonspecific membranes to help control the movement of fluid and ionic species within the cell. Reference will now be made to FIGS. 11-13 in relation to examples of some possible electrolytic cell configurations for inclusion in an electrolysis reactor.

FIG. 11 illustrates one example configuration for an electrolytic cell that may be used in the electrolysis processing 110 (FIGS. 2 and 5). As shown in FIG. 11, the electrolyte cell includes a cathode 202 and an anode 204, which will be connected to a DC electrical power source during operation of the electrolytic cell. The electrolytic cell also includes two ion-specific membranes, a cathode exchange membrane 206 and an anion exchange membrane 208. The electrolytic cell includes three distinct regions, or chambers. A first region, which may be referred to as a cathode region, includes the space between the cathode 202 and the cation exchange membrane 206. A second region, which may be referred to as an anode region, includes the space between the anode 204 and the anion exchange membrane 208. The third region, which may be referred to as a central region, includes the space between the cation exchange membrane 206 and the anion exchange membrane 208. During operation of the electrolytic cell, the cathode 202 and anode 204 are connected in an electrical circuit with a DC electrical power source, as indicated by the arrows that show the flow of electrons to the cathode and from the anode in an electrical circuit. Water is electrolyzed generating hydronium ions (indicated by $H^+$) at the anode 204 and with accompanying generation of oxygen gas at the anode 204. The electrolyzing of the water also generates hydroxide ion at the cathode 202 and is accompanied by generation of hydrogen gas at the anode 202. Electrolyte solution 210 containing dissolved sodium and sulfate ions (e.g., sodium sulfate and/or sodium bisulfate) may be supplied to the central region between the cation exchange membrane 206 and the anion exchange membrane 208. Sodium ions in the electrolyte solution 210 may pass through the cation exchange membrane and together with hydroxide ions form sodium hydroxide in the cation region. Sulfate ions in the electrolyte solution 210 may pass through the anion exchange membrane 208 and together with hydronium ions form sulfuric acid in the anion region. A sodium hydroxide solution may be recovered from the cathode region and a sulfuric acid solution may be recovered from the anode region. The hydrogen gas and oxygen gas may also be separately collected as a hydrogen gas product and an oxygen gas product. During operation, a more dilute sodium hydroxide solution that may be added to the cathode region to prepare a more concentrated sodium hydroxide solution may be removed from the cathode region. Similarly, a more dilute sulfuric acid solution may be added to the anode region during operation to prepare a more concentrated sulfuric acid solution that may be removed from the anode region. The more dilute sodium hydroxide solution addition to the cathode region may be provided by recirculation of a diluted portion of the sodium hydroxide solution previously recovered from the cathode region. Likewise, the more dilute sulfuric acid solution addition to the anode region may be provided by recirculation of a diluted portion of the sulfuric acid solution previously recovered from the anode region. In one implementation, the more dilute sodium hydroxide solution may be added at the top of the cathode region as shown by the arrow 211 and the more concentrated hydroxide solution may be removed from the bottom portion of the cathode region. Likewise, the more dilute sulfuric acid solution may be added to the top of the anode region, as shown by the arrow 213, and the more concentrated sulfuric acid solution may be recovered from the bottom portion of the anode region. Unconsumed electrolyte solution 212 may be removed from the central region. Such unconsumed electrolyte solution 212, or a portion thereof, may be purged from the system. The unconsumed electrolyte solution 212, or a portion thereof, may be recycled for use to prepare the electrolyte solution 210 that is fed to the central chamber of the electrolytic cell. Shown in FIG. 11 is the overall chemical equation for consumption of sodium sulfate and water to produce hydrogen gas, sulfuric acid, oxygen gas and sodium hydroxide in the electrolytic cell.

With continued reference to FIG. 11, it should be appreciated that the electrolyte solution 210 as fed to the electrolytic cell may or may not be of the same composition as the feed of electrolyte solution 108 as described with respect to FIGS. 2 and 5. Referring also to FIGS. 2 and 5, the electrolysis processing 110 may include further processing of the feed of electrolyte solution 108 that results in the electrolyte solution 210 that is introduced into the central chamber of the electrolytic cell shown in FIG. 11. A similar situation will also be the case with other possible cell configurations, in that the electrolyte solution as introduced into the electrolytic cell may not necessarily be of the same composition as the feed of electrolyte solution 108. Such an electrolyte solution 210 as introduced into an electrolytic cell will include water and dissolved sodium and sulfate components originating from the feed of electrolyte solution 108. Careful preparation of the feed of electrolyte solution 108 with particular properties provides an important control to reduce introduction of contaminants into the electrolytic processing 110, for example to eliminate sources of any significant quantities of dissolved chloride, that may ultimately be introduced into the electrolytic cell.

As shown in FIG. 11, the flow of electrolyte solution through the central region is countercurrent to the flow of sodium hydroxide solution and sulfuric acid solution in the cathode region and anode region, respectively. Although such an operation may be preferred in many circumstances, it is also possible that flow could be concurrent between the central region and one or both of the anode region and the cathode region. Also, it should be appreciated that the electrolytic cell of FIG. 11 may be one cell in a large bank of multiple cells within an electrolytic reactor. For example, such a bank of electrolytic cells could be made up of alternating cathodes and anodes, with the ion-specific membranes disposed between each anode and cathode pair. Flow into and out of each cathode region, central region and anode region of a cell may be controlled by any appropriate technique, such as for example manifolding to direct flow into and out of the respective region of each cell.

Reference is now made to FIG. 12, which illustrates another example configuration for an electrolytic cell that may be used in the electrolysis processing 110 (FIGS. 2 and 5). The electrolytic cell configuration shown in FIG. 12 is a two region configuration that may be used to prepare sodium hydroxide and a lower-quality acidic sulfate product, or "salty" acid product, such as may contain significant sodium bisulfate.

Reference numerals used in FIG. 12 refer to like components as those shown in and described with respect to FIG. 11. As shown in FIG. 12, the electrolytic cell includes the anode 202, the cathode 204 and the cation exchange membrane 206. The electrolytic cell does not include an anion exchange membrane. The electrolytic cell includes a cathode region similar to that described for FIG. 11. The electrolytic cell also includes an anode region that is the space between the cation exchange membrane 206 and the anode 204. During operation, electrolyte solution 216 containing dissolved sodium sulfate and/or sodium bisulfate is fed into to the anode region and a salty acid solution 218 containing sodium bisulfate is recovered from the anode region. As will be appreciated, the electrolyte solution 216 introduced into the anode region is shown as containing sodium sulfate, but may contain a significant quantity of sodium bisulfate, with the salty acid solution 218 being more acidic and containing a higher concentration of sodium bisulfate and possibly some sulfuric acid. A sodium hydroxide solution 220 is recovered from the cathode region. As with the operation described previously with respect to FIG. 11, a more dilute sodium hydroxide solution 222 may be fed into the cathode region. As shown in FIG. 12, the cathode region and anode region are operated in countercurrent flow, which may be preferred for many implementations but is not required. The configuration shown in FIG. 12 benefits from a lower voltage penalty across the electrolytic cell than the configuration of FIG. 11 because of the elimination of the anion exchange membrane. This configuration of FIG. 12 may be advantageous when it is desired to make a clean sodium hydroxide product but it is not required that a clean sulfuric acid product be produced.

Reference is now made to FIG. 13, which illustrates another example embodiment for a configuration of an electrolytic cell that may be included in an electrolysis reactor for use during the electrolysis processing (e.g., as shown in FIGS. 2 and 5). As shown in FIG. 13, the electrolytic cell has a two region configuration designed to produce a clean sulfuric acid product and a "salty" base product. Reference numerals of like components are the same as used in FIG. 11 and FIG. 12. The electrolytic cell as shown in FIG. 13 includes the cathode 202, the anode 204 and the anion exchange membrane 208. An electrolyte solution 224 containing sodium sulfate is introduced into the cathode region between the cathode 202 and the anion exchange membrane 208. A salty sodium hydroxide solution 226 is recovered from the cathode region. The salty sodium hydroxide solution 226 includes sodium hydroxide and a significant concentration of sodium sulfate. Recovered from the anode region is a sulfuric acid solution 228. Similar to the description with FIG. 11, a more dilute sulfuric acid solution 230 may be introduced into the anode region. As with the operation shown in FIG. 12, so also the cell configuration of FIG. 13 has a benefit of avoiding a voltage penalty by removing the cation exchange membrane, relative to the configuration of FIG. 11. An electrolytic cell configuration such as that shown in FIG. 13 may be useful, for example, when it is desired to prepare a clean sulfuric acid solution but it is not necessary to produce a clean sodium hydroxide solution. Flow in the anode region and the cathode region in FIG. 13 are also shown in countercurrent flow, but again such a flow arrangement is not necessary, even if it may be preferred for many implementations.

Figure 14:
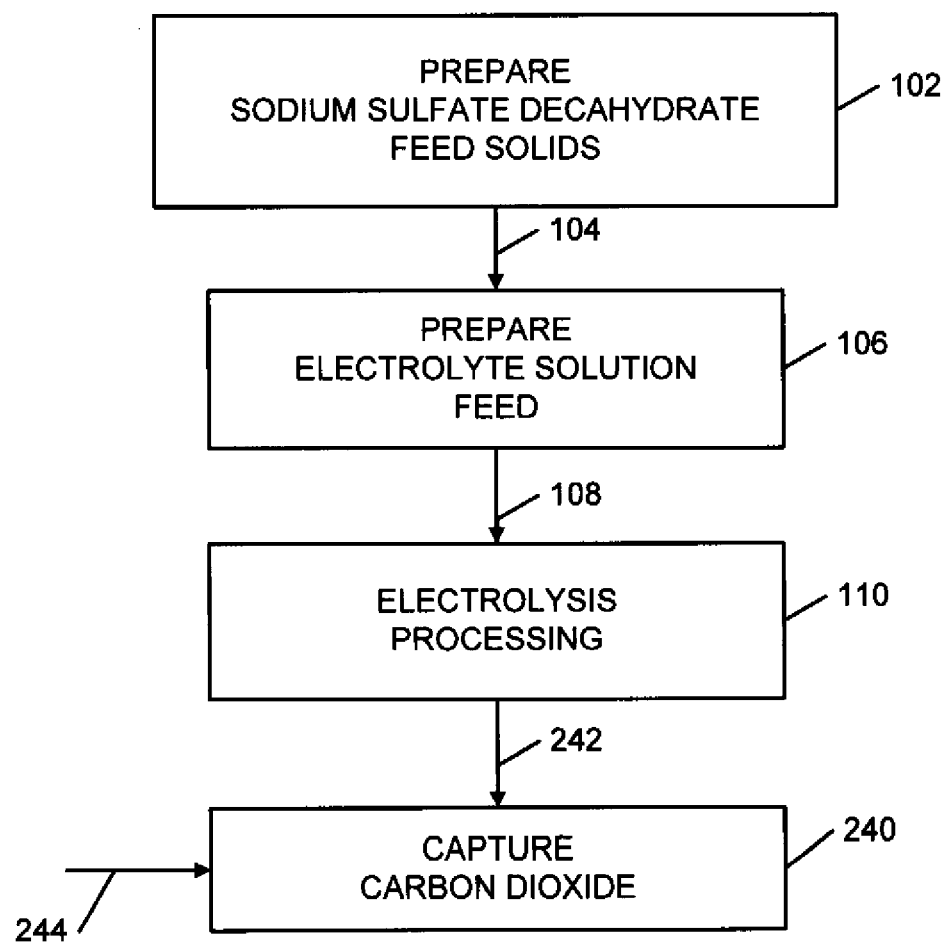
FIG. 14 is a general process block diagram of an embodiment of processing according to the invention.

One primary objective for the invention is to provide a process that may advantageously incorporate carbon dioxide capture in an economic manner while producing valuable products. Reference is now made to FIG. 14, which includes a general process block diagram illustrating one embodiment of processing according to the invention, which includes carbon dioxide capture. Reference numerals are the same as previously used in FIGS. 2-10 for like features. FIG. 14 is the same as FIG. 2, except including, after the step of electrolysis processing 210, a step 240 to capture carbon dioxide using sodium hydroxide 242 from the electrolysis processing 110. During the step 240, a solution containing sodium hydroxide produced during the electrolysis processing 110 is contacted with carbon dioxide in a manner to form dissolved sodium-containing carbonate material (e.g., sodium carbonate and/or sodium bicarbonate). The source of carbon dioxide will typically be a gas containing some concentration of carbon dioxide. The gas may be ambient air containing the small amount of carbon dioxide present in the ambient air. Alternatively, the gas containing the carbon dioxide may be more concentrated in carbon dioxide than is the case for ambient air. One advantageous source for the carbon dioxide-containing gas is flue gas from combustion of a carbon-containing fuel (e.g., coal, biomass, oil, gas, etc.). The hydroxide 242 may be used in a solution as prepared during the electrolysis processing 110 or in a different form that is a result of further processing following the electrolysis processing 110. For example, a solution of sodium hydroxide as recovered during electrolysis processing may be further concentrated, such as by evaporation of water, to prepare a more concentrated sodium hydroxide solution that is used in the step 240 to capture carbon dioxide. In some implementations, the sodium hydroxide 242 may be used in the step 240 in a solution as directly produced during the electrolysis processing 110, and concentrated by evaporation during contacting with the carbon dioxide. The captured carbon dioxide in the form of sodium carbonate and/or sodium bicarbonate may be retained and sequestered in that carbonate form, or may be converted to a different form for sequestration, or may be released as a purified carbon dioxide gas for use in various industrial or oil recovery operations.

Figure 15:
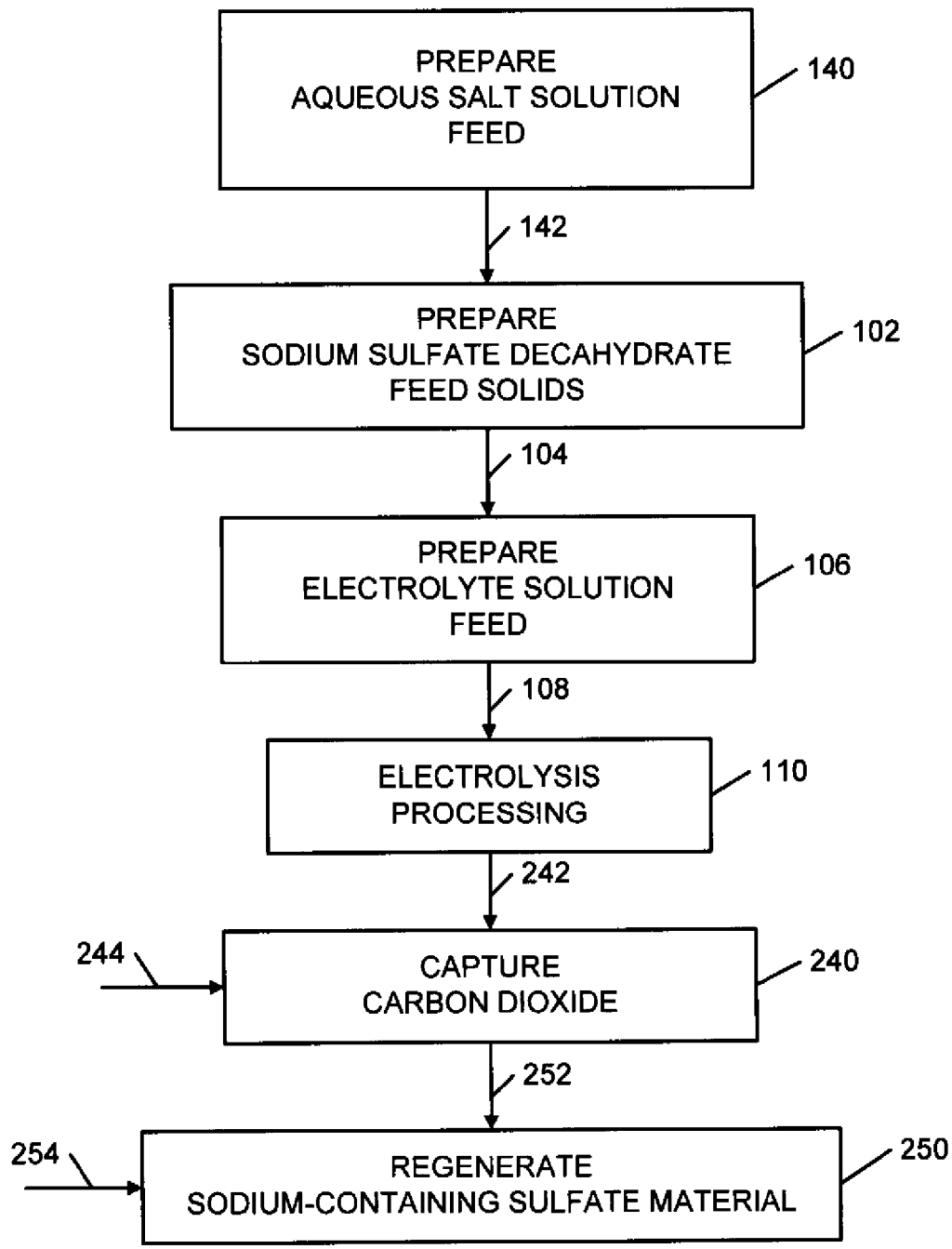
FIG. 15 is a general process block diagram of an embodiment of processing according to the invention.
Figure 16:
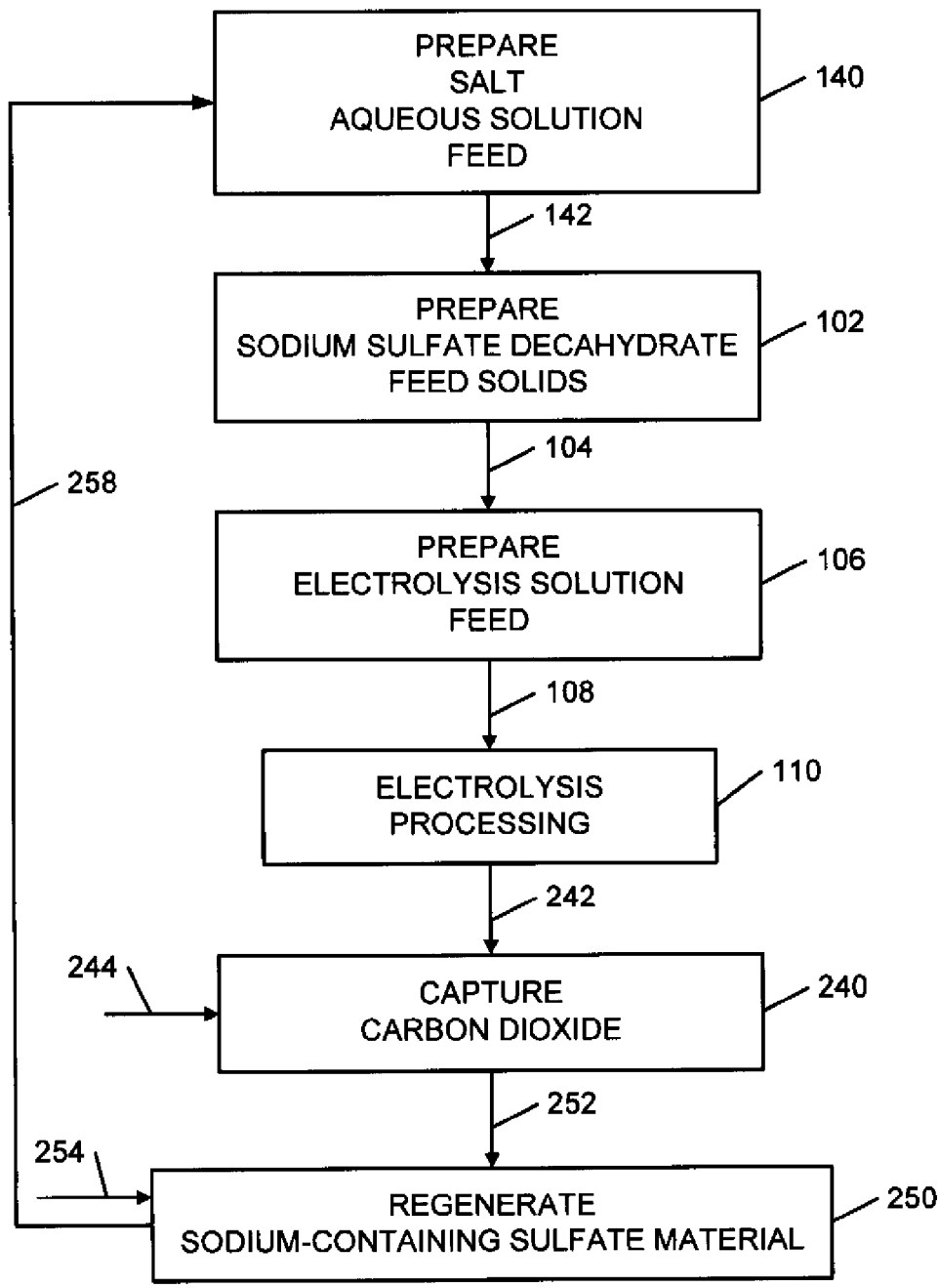
FIG. 16 is a general process block diagram of an embodiment of processing according to the invention.

Reference is now made to FIG. 15, which includes a general process block diagram illustrating an embodiment of processing of the invention. FIG. 15 is the same as FIG. 14, except including the step 140 to prepare aqueous salt solution feed, as shown in and described with respect to FIG. 5, and including an additional step 250 to regenerate sodium-containing sulfate material using carbonate-containing material 252 (e.g., sodium carbonate and/or sodium bicarbonate) generated during the step 240. During the step 250, a solution containing dissolved sodium-containing carbonate material is contacted with a calcium sulfate reagent 254 to precipitate calcium carbonate and form dissolved sodium-containing sulfate material (e.g., sodium sulfate and/or sodium bisulfate), and preferably dissolved sodium carbonate. The processing during the step 250 may be substantially the same as described previously with respect to FIG. 8 in relation to preparing the feed of the salt solution 142, and the calcium sulfate reagent 254 may be as described previously with respect to the calcium sulfate reagent 164 shown in and described with respect to FIG. 8. To enhance the operation during the step 250 as shown in FIG. 15, an initial sodium-containing carbonate solution as generated during the step 240 may be concentrated in the step 250, such as by evaporating water from the solution, to prepare a more concentrated sodium-containing carbonate solution, which is then contacted with the calcium sulfate reagent 254 to precipitate calcium carbonate and prepare the dissolved sodium-containing sulfate material. Such regenerated sodium-containing sulfate material may be recycled as feed to provide sodium sulfate for preparing the feed solids 104 of sodium sulfate decahydrate for further use in processing. An example of such an embodiment is shown in FIG. 16, which is the same as FIG. 15, except including recycle of regenerated sodium-containing sulfate material 258 for use in the step 140 to prepare aqueous salt solution feed. The regenerated sodium-containing sulfate material may be in the form of a solution as resulting from the step 250. Such a solution may be used directly as the feed of salt solution 142 or may be subjected to additional processing in step 140 to prepare the feed of salt solution 142. As will be appreciated, an alternative way to illustrate the processing shown in FIG. 16 would be to include the step 250 as part of the step 140, similar to processing shown in FIG. 8.

The effect of processing such as shown in FIG. 16 is that sodium sulfate may be used and regenerated for use to capture carbon dioxide in the form of calcium carbonate, using a feed of calcium sulfate reagent to supply sulfate feed to replace that removed as sulfuric acid or other acidic sulfate products recovered from electrolysis processing. Reference is made to FIG. 17, which illustrates such a processing cycle involving electrolysis of sodium sulfate electrolyte solution to produce oxygen gas, hydrogen gas, sulfuric acid and sodium hydroxide, with sodium hydroxide used to capture carbon dioxide and prepare sodium carbonate, which is then contacted with the calcium sulfate (e.g., gypsum) to sequester the carbon dioxide as a calcium carbonate and regenerate the sodium sulfate for further use in the cycle.

Figure 18:
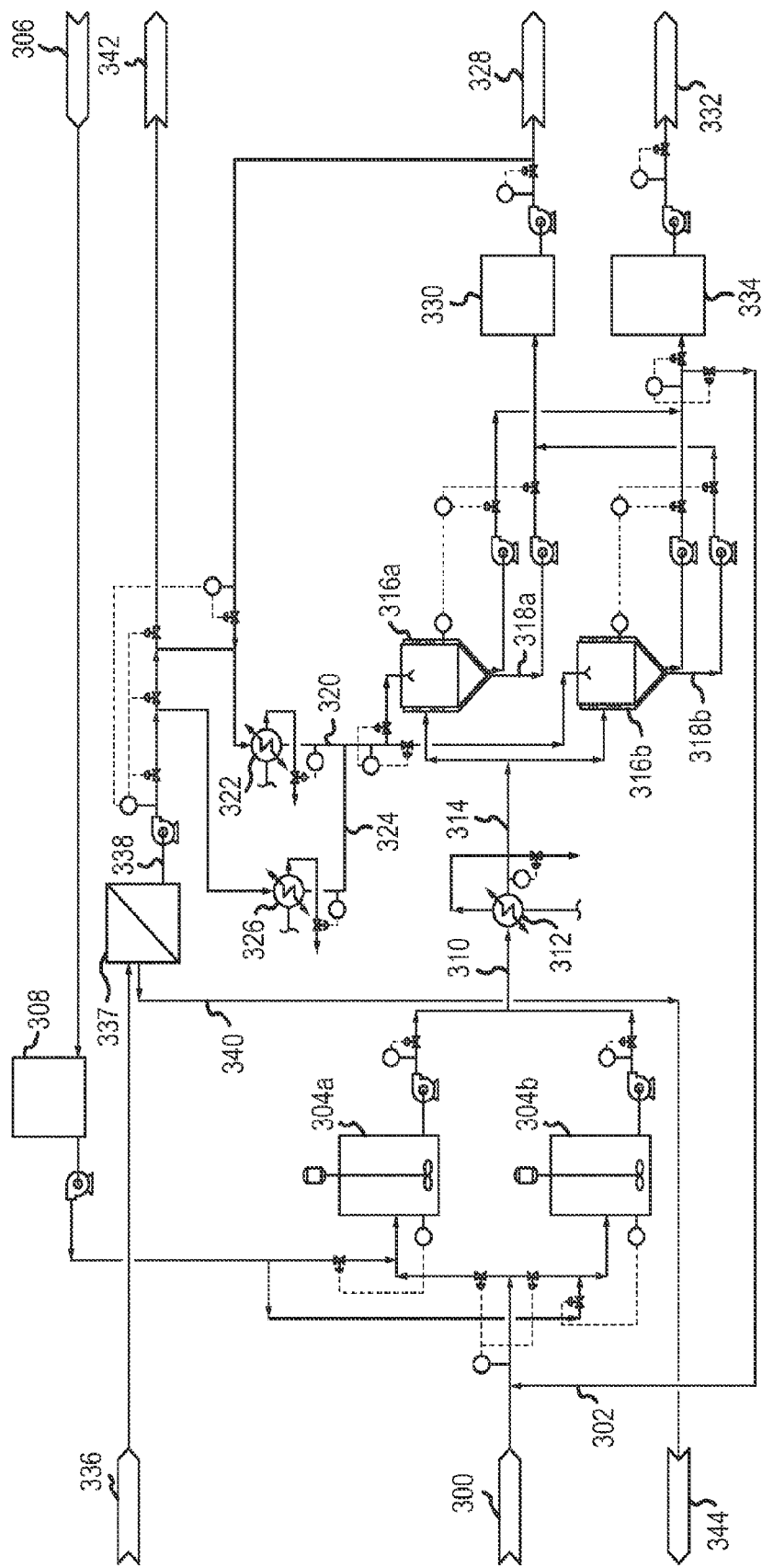
FIG. 18 is a general process flow diagram of one embodiment for processing according to the invention.
Figure 19:
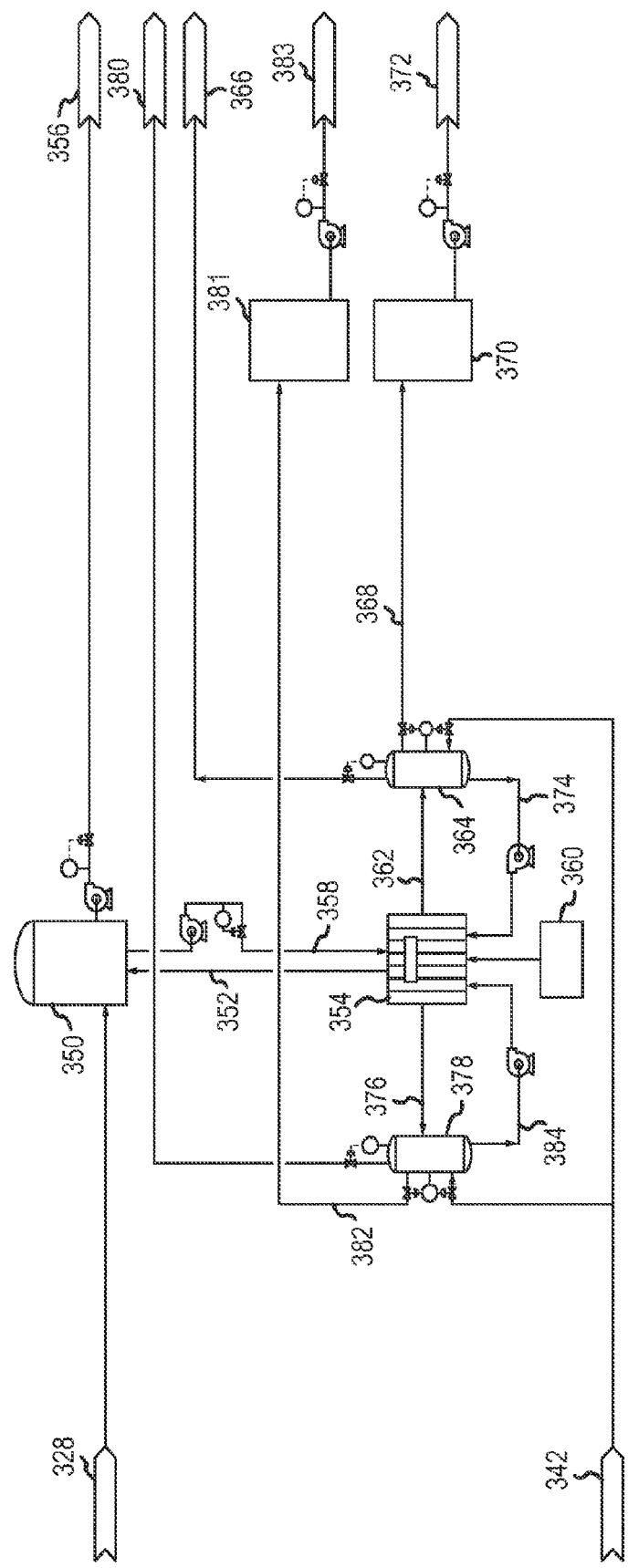
FIG. 19 is a general process flow diagram of one embodiment for processing according to the invention.
Figure 20:
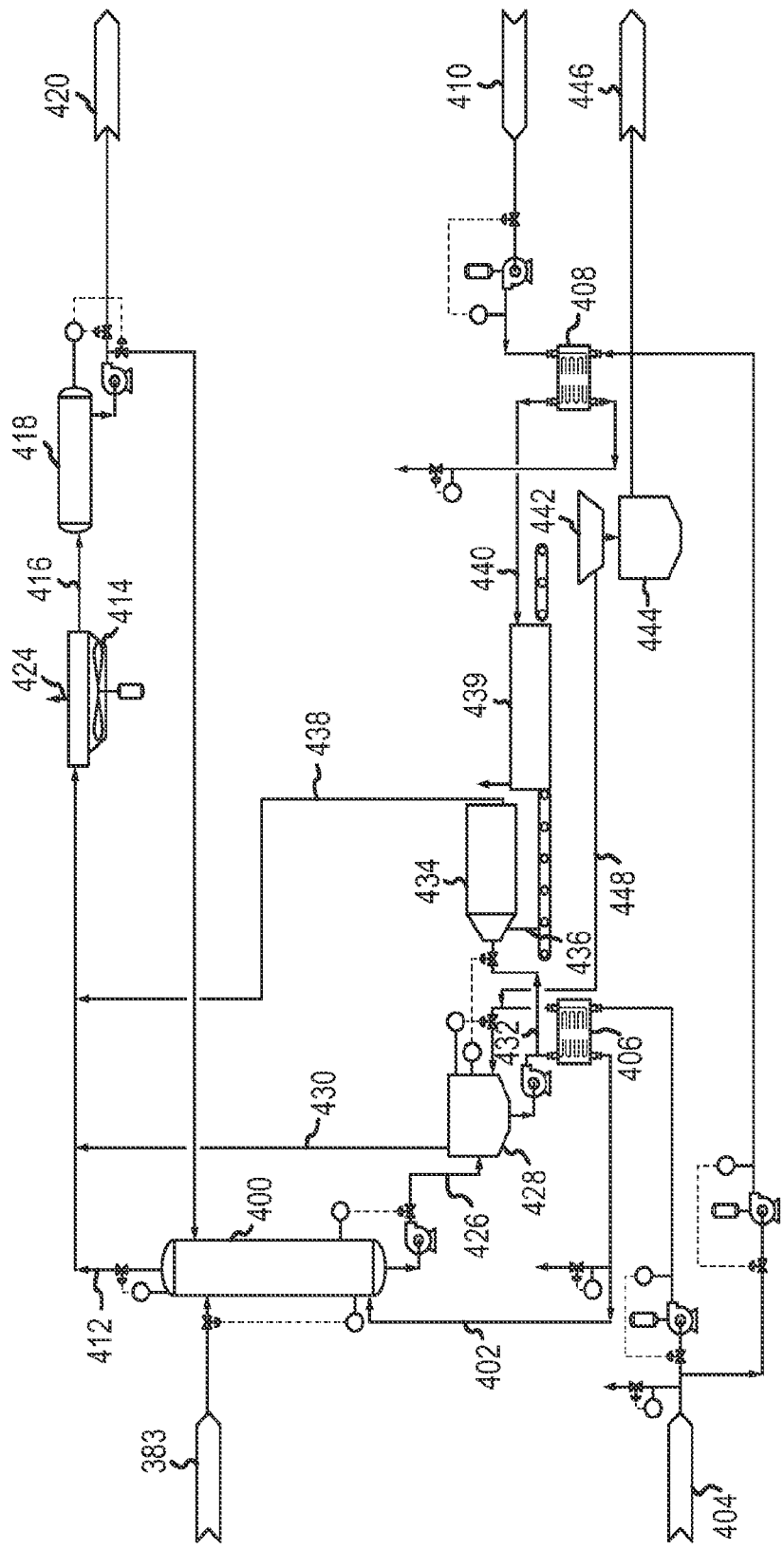
FIG. 20 is a general process flow diagram of one embodiment for processing according to the invention.

Reference is now made to FIGS. 18-20 with general process flow diagrams illustrating an example of processing including electrolysis processing to prepare sodium hydroxide, sulfuric acid, hydrogen gas and oxygen gas, and with capture of carbon dioxide.

FIG. 18 shows processing including preparation of a feed of aqueous electrolyte solution for use during electrolysis processing, and preparation of a feed of salt solution used to prepare of sodium sulfate decahydrate feed solids used to prepare the feed of electrolyte solution. As illustrated in FIG. 18, a solid sodium sulfate crude salt product 300 is mixed with water 302 and fed to parallel tanks 304a,b. Also added to the tanks 304a,b as needed for pH adjustment and/or precipitation of multivalent cations are reagents 306 supplied from a tank 308. The softening reagents 306 may, for example, include a solution of sodium carbonate and/or sodium hydroxide, and may be suitably basic to adjust upward the pH in the tanks 304a,b to a desired level above pH 7.0. The sodium sulfate from the crude salt feed 300 is dissolved in the water in the tanks 304a,b at a pH preferably of about pH 7.5 to pH 8.0, to a desired concentration of sodium sulfate (e.g., 30% w/v), at a desired temperature (e.g., 30° C.). The salt solution as prepared in the tanks 304a,b is used as a feed for preparation of feed solids of sodium sulfate decahydrate. The feed of salt solution 310 withdrawn from the tanks 304a,b is fed through a heat exchanger 312 to reduce the temperature of the salt solution to a reduced temperature to cause precipitation of sodium sulfate decahydrate from the salt solution. A cooled salt solution 314 at a reduced temperature (e.g., 0-5° C.) is fed to two tanks 316a,b. In the tanks 316a,b, the salt solution is maintained at a reduced temperature sufficient to promote substantial precipitation of sodium sulfate decahydrate, which will collect as precipitated crystals within the tanks 316a,b. After a sufficient residence time for precipitation and desired crystal formation, liquid is removed from the tanks 316a,b through drains 318a,b to separate process liquid from the sodium sulfate decahydrate precipitate. The sodium sulfate decahydrate precipitate may then be washed in the tanks 316a,b by introduction of chilled wash liquid 320. Used wash liquid is also removed from the tanks 316a,b through the drains 318a,b. The wash liquid 320 should be at a reduced temperature (e.g., minus 5° C. to 5° C.) to prevent significant dissolution of the precipitated sodium sulfate decahydrate during washing operations. Also, although not shown in FIG. 18, the wash solution, at the reduced temperature as introduced into the tanks 316a,b, may be saturated or nearly saturated in dissolved sodium sulfate to further reduce the potential for significant dissolution of the precipitated sodium sulfate decahydrate. After the sodium sulfate decahydrate precipitate in the tanks 316a,b has been adequately washed, then clean, heated water 324 is introduced into the tanks 316a, 316b to dissolve the sodium sulfate decahydrate. The heated water 324 is heated to an appropriate temperature (e.g., 90° C.) by heat exchanger 326. The heated water 324 should be at a sufficiently high temperature to dissolve all of the sodium sulfate decahydrate and result in a final solution temperature sufficient to maintain solubility of the dissolved sodium sulfate. The resulting solution may serve as a feed of electrolyte solution 328 to be provided to electrolysis processing. The feed of the electrolyte solution 328 may be supplied from a holding tank 330 maintained at an appropriate temperature. Liquid removed through the drains 318a,b will contain dissolved impurities (e.g., sodium chloride) and residual dissolved sodium sulfate from the crude salt feed 300. This liquid may be used as all or part of the water 302 mixed with the crude salt 300. To prevent a buildup of impurities, a portion of the liquid removed through the drains 318a,b may be removed as a purge stream 332 from tank 334. The processing as shown in FIG. 18 is designed for alternating batch processing through tanks 304a and 304b and through tanks 316a and 316b. One of the tanks 304a or 304b may be used to supply the feed of salt solution 310 while the other tank is being used to prepare a fresh batch of salt solution. Likewise, one of the tanks 316a or 316b may be used to supply prepared electrolyte solution to tank 330 to provide of the feed of electrolyte solution 328, while the other tank is being used to prepare a fresh batch of electrolyte solution. As shown in FIG. 18, water for use in the process originates from a water supply 336 that is purified by membrane purification 337 (e.g., reverse osmosis) to prepare polished water 338 including permeate of the membrane purification 336 and a salty concentrate 340 including a retentate from the membrane purification 336. The membrane purification 336 may be a single stage operation or may involve a multistage operation. Additional polishing may be provided by ion exchange or carbon filtration as needed. The polished water 338 is used to prepare the wash liquid 320 and the heated water 324 used in preparation of the feed of electrolyte solution 328. The polished water 338 also provides a source of clean process water 342 which may be used elsewhere in the process. Some or all of the salty concentrate 340 may be removed from the system as a purge stream 344. The use of the polished water 338 to prepare the feed of electrolyte solution 328, in combination with the selective precipitation of sodium sulfate decahydrate in the tanks 316a,b, permits preparation of the feed of the electrolyte solution 328 to contain acceptably low levels of contaminants, and in particular acceptably low levels of dissolved chloride, for use in electrolysis processing.

Reference is now made to FIG. 19, which shows a general process flow diagram for electrolysis processing using the feed of electrolyte solution 328 prepared as shown in FIG. 18. As shown in FIG. 19, at least a portion of the feed of electrolyte solution 328 is supplied to an electrolyte control tank 350, to mix with recirculated electrolyte solution 352 from an electrolysis reactor 354. The composition of the recirculated electrolyte solution 352 will be dependent upon the particular cell configuration and operating conditions within the electrolysis reactor 354. In the embodiment shown, it is assumed that the electrolysis reactor includes a three region cell configuration, for example as shown in FIG. 11. A portion of the electrolyte solution is removed from the electrolyte control tank 350, continuously or occasionally, as a purge stream 356 to prevent buildup of contaminants. Electrolyte solution 358 from the electrolyte control tank 350 is supplied to the electrolysis reactor 354. Concentrated anolyte 362 is removed from the electrolysis reactor 354 and provided to a vessel 364. Oxygen gas is permitted to separate from the anolyte 362 in the vessel 364 and an oxygen gas product 366 is collected from the vessel 364. Also collected from the vessel 364 is a sulfuric acid solution 368 which may be collected in a tank 370. A supply of the sulfuric acid solution 372 may be used as a final product or may be further processed, for example, to prepare a more concentrated sulfuric acid product. For example, the sulfuric acid solution 368 may comprise approximately 10 percent sulfuric acid and may be processed through an evaporative concentrator to concentrate the sulfuric acid, for example, to a battery-grade sulfuric acid (e.g., at least 33 weight percent acid) or higher. A return anolyte feed 374 is supplied from the vessel 364 back to an anode region of the electrolysis reactor 354. Clean process water 342 may be provided to form part of the volume of the return anolyte feed 374 to make up for the removal of the sulfuric acid solution 368 and the oxygen gas product 366. In like manner, a concentrated catholyte 376 is removed from the electrolysis reactor 354 and provided to a vessel 378 where hydrogen gas is allowed to separate to permit collection of a hydrogen gas product 380. A sodium hydroxide solution 382 is removed from the vessel 378 and supplied to a tank 381 from which a supply of sodium hydroxide solution 383 may be used as a final product or may be further processed. Similar to the situation as described with respect to sulfuric acid, the sodium hydroxide solution 382 may be a relatively dilute solution (e.g., 10 weight percent) and may be further processed to a more concentrated sodium hydroxide solution, for example, through evaporative concentration. A return catholyte feed 384 is supplied to the cathode region of the electrolysis reactor, and including sufficient clean process water 342 to compensate for product removal.

Reference is now made to FIG. 20, which includes a general process flow diagram illustrating carbon dioxide capture processing using at least a portion of the supply of sodium hydroxide solution 383 from FIG. 19. At least a portion of the sodium hydroxide solution 383 is fed to a contactor 400 where the sodium hydroxide solution is contacted with a carbon dioxide-containing gas 402 that is also supplied to the contactor 400. In the example illustrated in FIG. 20, a hot source of carbon dioxide-containing gas 404 is cooled through a heat exchanger 406 prior to introduction into the contactor 400. The hot source of carbon dioxide-containing gas 404 may, for example, be provided by a combustion flue gas. A portion of the hot source of the carbon dioxide-containing gas 404 may be diverted to a heat exchanger 408 for use to heat input air 410 for use in the process. An overhead vent stream 412 from the contactor 400 will include significant water vapor, which may be condensed in a condenser 414. Condensed water 416 may be provided to a tank 418 from which a supply of recovered water 420 may be provided. Alternatively, a portion of the water from the tank 418 may be returned to the contactor 400 as recycle water 422. For example, the supply of recovered water 420 may be used as part of the water supply 302 processed through the membrane filtration 336 (FIG. 18). A gaseous bleed 424 containing carbon dioxide and other impurities is purged from the system to prevent buildup of gaseous contaminants. In the contactor 400, carbon dioxide reacts with sodium hydroxide to form a solution containing dissolved sodium carbonate. A sodium carbonate solution 426 is removed from the contactor 400 and provided to an evaporative crystallizer 428, where the sodium carbonate solution may be circulated through the heat exchanger 406 to heat the sodium carbonate solution to permit concentration of the sodium carbonate solution to a higher concentration with the removal of hot water vapor 430, which is provided to the condenser 414 for water recovery. In the evaporative crystallizer 428, sodium carbonate becomes oversaturated and precipitates and forms sodium carbonate crystals. Sodium carbonate precipitate 432 is provided to a centrifuge 434 to separate sodium carbonate precipitate 436 from aqueous liquid 438, which is provided to the condenser 414. Separated sodium carbonate precipitate 436 is then conveyed to a dryer 439 where the sodium carbonate precipitate is dried with hot air 440. Dried sodium carbonate precipitate from the dryer 439 is then processed through a sieve 442. Properly sized sodium carbonate particles are collected in a bin 444 from which a sodium carbonate product 446 (e.g., soda ash) may be provided. Improperly sized sodium carbonate particles 448 (e.g., undersize particles) are returned to the evaporative crystallizer. The precipitated calcium carbonate recovered from the evaporative crystallizer 428 will typically be in a monohydrate form.

Figure 21:
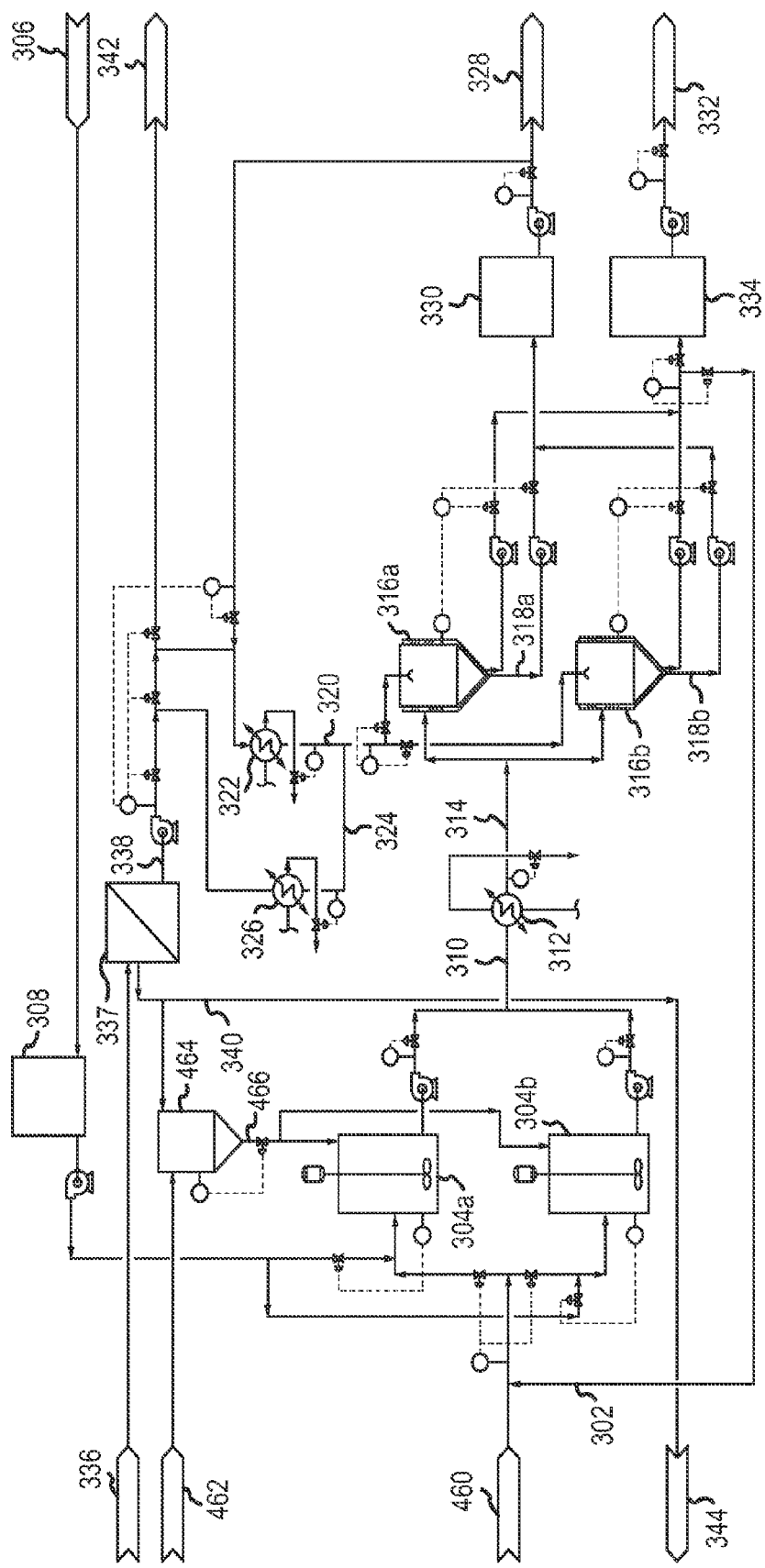
FIG. 21 is a general process flow diagram of one embodiment for processing according to the invention.

Reference is now made to FIG. 21, which shows an alternative embodiment to that shown in FIG. 18 for front-end processing to prepare feed of electrolyte solution, beginning with a mixed salt brine feed rather than a solid calcium sulfate salt product. Such a mixed salt brine feed may be sourced, for example, from industrial operations, from surface water, from ground water, from agricultural drainage, from produced water with oil and gas operations or from other sources. For ease of description, like process features in FIG. 21 are identified with the same reference numerals used in FIG. 18 for those process features. As shown in FIG. 21, a brine solution feed 460 is combined with water 302 and provided to the tanks 304a,b where the feed of salt solution 310 is prepared. The brine mixture as delivered to the tanks 304a,b contains at least dissolved sodium sulfate and dissolved sodium chloride. A sodium chloride reagent 462 is mixed with a portion of the salty concentrate 340 from the membrane water purification 336 in a tank 464 to form a sodium chloride concentrate which may be used to adjust upward as desired the concentration of sodium chloride of aqueous liquid being processed in the tanks 304a,b to provide a desired sodium chloride concentration in the feed of salt solution 310. To the extent that the sodium chloride concentration in the tanks 304a,b as provided by the brine solution feed 460 and the water 302 is less than about 1 weight percent, then the advantages of adjusting upward the sodium chloride concentration in the tanks 304a,b may not outweigh added problems associated with sodium chloride in the system and the concentration of sodium chloride in the tanks 304a,b might not be adjusted by addition of sodium chloride concentrate from the tank 464. However, especially in situations when the sodium chloride concentration in the tanks 304a,b as provided by the brine solution feed 460 and water 302 is greater than about 1 weight percent, sodium chloride concentrate solution 466 may be provided to the tanks 304a,b to adjust upward the sodium chloride concentration of the solution in the tanks 304a,b to a desired level (e.g., 5 to 15 weight percent sodium chloride), although more thorough washing, and/or a redissolution and reprecipitation in the tanks 316a,b might be included to ensure desired low chloride level on resulting solids feed of sodium sulfate decahydrate and in the feed of electrolyte solution 328. The resulting feed of salt solution 310 will contain the higher concentration of sodium chloride, which will assist in promoting precipitation of sodium sulfate decahydrate in the tanks 316a,b during processing to prepare sodium sulfate decahydrate feed solids. Processing as shown in FIG. 21 is generally otherwise as described with respect to FIG. 18.

The foregoing discussion of the invention and different aspects thereof has been presented for purposes of illustration and description. The foregoing is not intended to limit the invention to only the form or forms specifically disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Although the description of the invention has included description of one or more possible implementations and certain variations and modifications, other variations and modifications are within the scope of the invention, e.g., as may be within the skill and knowledge of those in the art after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Furthermore, any feature described or claimed with respect to any disclosed implementation may be combined in any combination with one or more of any other features of any other implementation or implementations, to the extent that the features are not necessarily technically incompatible, and all such combinations are within the scope of the present invention.

The terms "comprising", "containing", "including" and "having", and grammatical variations of those terms, are intended to be inclusive and nonlimiting in that the use of such terms indicates the presence of some condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or the appropriate grammatical variation of such narrower terms). For example, the a statement that some thing "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. All concentrations disclosed herein are on a weight basis unless otherwise stated. The term "ppm" refers to parts per million by weight. All liquids and solutions referred to herein are aqueous unless otherwise noted. A concentration of a solute component expressed as percent w/v refers to a percentage determined by comparing a weight of the component in grams to the volume of solvent (e.g., water) in milliliters in which the solute component is dissolved. For example, dissolving 10 grams of sodium sulfate in 100 milliliters of water would result in a concentration of sodium sulfate of 10% w/v.

What is claimed is:

1. A method for chemical manufacture, the method comprising:
preparing sodium hydroxide and acidic sulfate material, the preparing sodium hydroxide and acidic sulfate material comprising electrolysis processing of an aqueous electrolyte solution comprising dissolved sodium-containing sulfate material selected from the group consisting of sodium sulfate, sodium bisulfate and combinations thereof;
wherein the electrolysis processing comprises electrolyzing water of the aqueous electrolyte solution to generate hydronium ions at an anode and hydroxide ions at a cathode, and wherein the acidic sulfate material is selected from the group consisting of sulfuric acid, sodium bisulfate and combinations thereof;
preparing feed solids of sodium sulfate decahydrate, the preparing feed solids of sodium sulfate decahydrate comprising precipitating sodium sulfate decahydrate from an aqueous salt solution;
preparing a feed of the aqueous electrolyte solution, the preparing the feed of the aqueous electrolyte solution comprises dissolving at least a portion of the feed solids in the water;
providing the feed of the aqueous electrolyte solution to the electrolysis processing; and
wherein:
the preparing feed solids comprises precipitating sodium sulfate decahydrate from an aqueous salt solution, a feed of the aqueous salt solution provided to the preparing the feed solids is a mixed salt solution comprising dissolved sodium sulfate and dissolved sodium chloride with the feed of the aqueous salt solution comprising at least 3 weight percent dissolved sodium chloride; and
the precipitating comprises reducing the temperature of the aqueous salt solution from a first temperature of at least 20° C. to a second temperature in a temperature range of from 0° C. to 10° C. and maintaining the concentration of the dissolved sodium chloride in the aqueous salt solution at or above 3 weight percent during the precipitating; and
maintaining the temperature of the aqueous salt solution at or above 0° C., with no formation of ice.

2. A method according to claim 1, wherein the feed of the aqueous salt solution comprises at least 5 weight percent of the dissolved sodium sulfate.

3. A method according to claim 2, comprising prior to the preparing the feed solids, preparing the feed of the aqueous salt solution provided to the preparing feed solids, wherein the preparing the feed of the aqueous salt solution comprises:
dissolving a solid sodium sulfate salt product in an aqueous liquid, wherein the solid sodium sulfate salt product comprises at least 500 parts per million by weight of sodium chloride.

4. A method according to claim 2:
wherein the precipitating comprises:
precipitating sufficient sodium sulfate decahydrate to reduce the amount of the dissolved sodium-containing sulfate material in the salt solution by at least 90 percent; and
retaining dissolved in the salt solution at least 90 percent of the sodium chloride.

5. A method according to claim 4, comprising:
preparing a carbonate-containing solution, comprising contacting at least a portion of the sodium hydroxide in solution with carbon dioxide to form dissolved sodium-containing carbonate material, wherein the sodium-containing carbonate material is selected from the group consisting of sodium carbonate, sodium bicarbonate and combinations thereof.

6. A method according to claim 5, comprising:
preparing regenerated sodium-containing sulfate material, comprising contacting a calcium sulfate reagent with at least a portion of the carbonate-containing solution comprising the dissolved sodium-containing carbonate material, to precipitate calcium carbonate and form dissolved sodium-containing sulfate material.

7. A method according to claim 6, comprising prior to the precipitating:
removing dissolved multivalent metal ions from the aqueous salt solution.

8. A method according to claim 6, wherein the preparing the feed solids comprises precipitating sodium sulfate decahydrate from an aqueous salt solution wherein a feed of the aqueous salt solution to the preparing the feed solids comprises at least a portion of the regenerated sodium-containing sulfate material.

9. A method according to claim 4, wherein the feed of the aqueous salt solution is prepared from an initial aqueous liquid feed selected from the group consisting of agricultural drainage water, groundwater, and water produced from oil or hydrocarbon gas production.

10. A method according to claim 4, comprising prior to the precipitating preparing the feed of the aqueous salt solution, the preparing the feed of the aqueous salt solution comprising:
contacting water with a mineral comprising sodium sulfate and dissolving into the water at least a portion of the sodium sulfate from the mineral.

11. A method according to claim 4, comprising prior to the precipitating preparing the feed of the aqueous salt solution, the preparing the feed of the aqueous salt solution comprising:
increasing a concentration of dissolved sodium chloride in an aqueous solution containing dissolved sodium-containing sulfate material.

12. A method according to claim 4, wherein the feed of the aqueous salt solution comprises from 10 weight percent to 33 weight percent of the dissolved sodium sulfate.

13. A method according to claim 12, wherein:
the feed of the aqueous electrolyte solution comprises no more than 100 milligrams dissolved chloride per liter of the feed of the aqueous electrolyte solution;
the water to the dissolving is provided at a temperature of at least 30° C.;
the method comprises after the precipitating and before the preparing the feed of the aqueous electrolyte solution, separating aqueous liquid from precipitated sodium sulfate decahydrate;
the method comprises after the separating and prior to the preparing the feed of the aqueous electrolyte solution, washing the sodium sulfate decahydrate with aqueous wash liquid to remove residual contaminants; and the precipitating comprises:
   after the reducing maintaining the aqueous salt solution in the temperature range for at least 15 minutes;
   precipitating sufficient sodium sulfate decahydrate to reduce the amount of the dissolved sodium-containing sulfate material in the salt solution by at least 90 percent;
   retaining dissolved in the salt solution at least 90 percent of the sodium chloride; and
   the precipitating is conducted at a pH in a range of pH 8 to pH 8.5.

14. A method according to claim 1, wherein the preparing the feed of the aqueous electrolyte solution comprises dissolving into the water at least 200 grams of the sodium sulfate decahydrate per liter of the water.

15. A method according to claim 1, wherein:
   the first temperature is at least 30° C. and the temperature range is from 7° C. to 0° C.;
   the water to the dissolving is provided at a temperature of at least 30° C.;
   the method comprises after the precipitating and before the preparing the feed of the aqueous electrolyte solution, separating aqueous liquid from precipitated sodium sulfate decahydrate; and
   the method comprises after the separating and prior to the preparing the feed of the aqueous electrolyte solution, washing the sodium sulfate decahydrate with aqueous wash liquid to remove residual contaminants.

16. A method according to claim 15, wherein:
   the feed of the aqueous salt solution comprises from 5 to 15 weight percent dissolved sodium chloride and from 10 weight percent to 33 weight percent dissolved sodium sulfate.

17. A method for chemical manufacture, the method comprising:
   preparing sodium hydroxide and acidic sulfate material, the preparing sodium hydroxide and acidic sulfate material comprising electrolysis processing of an aqueous electrolyte solution comprising dissolved sodium-containing sulfate material selected from the group consisting of sodium sulfate, sodium bisulfate and combinations thereof;
   wherein the electrolysis processing comprises electrolyzing water of the aqueous electrolyte solution to generate hydronium ions at an anode and hydroxide ions at a cathode, and wherein the acidic sulfate material is selected from the group consisting of sulfuric acid, sodium bisulfate and combinations thereof;
   preparing feed solids of sodium sulfate decahydrate, the preparing feed solids comprising precipitating sodium sulfate decahydrate from an aqueous salt solution;
   preparing a feed of the aqueous electrolyte solution, the preparing the feed of the aqueous electrolyte solution comprises dissolving at least a portion of the feed solids in the water;
   providing the feed of the aqueous electrolyte solution to the electrolysis processing;
   preparing a carbonate-containing solution, comprising contacting at least a portion of the sodium hydroxide in solution with carbon dioxide to form dissolved sodium-containing carbonate material, wherein the sodium-containing carbonate material is selected from the group consisting of sodium carbonate, sodium bicarbonate and combinations thereof;
   preparing regenerated sodium-containing sulfate material, comprising contacting a calcium sulfate reagent with at least a portion of the carbonate-containing solution comprising the dissolved sodium-containing carbonate material, to precipitate calcium carbonate and form dissolved sodium-containing sulfate material; and
   wherein the preparing the feed solids comprises precipitating sodium sulfate decahydrate from an aqueous salt solution wherein a feed of the aqueous salt solution to the preparing the feed solids comprises at least a portion of the regenerated sodium-containing sulfate material.

18. A method according to claim 17, wherein the calcium sulfate reagent comprises calcium sulfate from flue gas desulfurization.

19. A method according to claim 17, wherein the contacting at least a portion of sodium hydroxide with carbon dioxide comprises contacting the at least a portion of the sodium hydroxide with combustion flue gas.

20. A method according to claim 17, wherein:
   the precipitating comprises reducing the temperature of the aqueous salt solution from a first temperature of at least 25° C. to a second temperature of 7° C. or lower, and after the reducing maintaining the aqueous salt solution at a temperature of 7° C. or lower for at least 15 minutes;
   the water to the dissolving is provided at a temperature of at least 30° C.;
   the method comprises after the precipitating and before the preparing the feed of the aqueous electrolyte solution, separating aqueous liquid from precipitated sodium sulfate decahydrate;
   the method comprises after the separating and prior to the preparing the feed of the aqueous electrolyte solution, washing the sodium sulfate decahydrate with aqueous wash liquid to remove residual contaminants.

21. A method for chemical manufacture, the method comprising:
   preparing sodium hydroxide and acidic sulfate material, the preparing sodium hydroxide and acidic sulfate material comprising electrolysis processing of an aqueous electrolyte solution comprising dissolved sodium-containing sulfate material selected from the group consisting of sodium sulfate, sodium bisulfate and combinations thereof;
   wherein the electrolysis processing comprises electrolyzing water of the aqueous electrolyte solution to generate hydronium ions at an anode and hydroxide ions at a cathode, and wherein the acidic sulfate material is selected from the group consisting of sulfuric acid, sodium bisulfate and combinations thereof;
   preparing a feed of the aqueous electrolyte solution, the preparing the feed of the aqueous electrolyte solution comprises dissolving feed solids of sodium sulfate decahydrate in the water;
   providing the feed of the aqueous electrolyte solution to the electrolysis processing;
   preparing the feed solids of sodium sulfate decahydrate, the preparing feed solids of sodium sulfate decahydrate comprising precipitating sodium sulfate decahydrate from an aqueous salt solution, wherein a feed of the aqueous salt solution provided to the preparing the feed solids is a mixed salt solution comprising at least 3 weight percent dissolved sodium chloride and at least 10 weight percent dissolved sodium sulfate, and wherein the precipitating comprises:
      reducing the temperature of the aqueous salt solution from a first temperature of at least 20° C. to a second temperature in a temperature range of from 10° C. to 0° C.;

maintaining the temperature of the aqueous salt solution at or above 0° C., with no formation of ice;

maintaining the concentration of the dissolved sodium chloride at or above 3 weight percent during the precipitating;

precipitating sufficient sodium sulfate decahydrate to reduce the amount of the dissolved sodium-containing sulfate material in the salt solution by at least 90 percent; and retaining dissolved in the salt solution at least 90 percent of the sodium chloride; and wherein the feed of the aqueous electrolyte solution comprises no more than 100 milligrams dissolved chloride per liter of the feed of the aqueous electrolyte solution.

22. A method according to claim 21, wherein:

the precipitating comprises reducing the temperature of the aqueous salt solution from a first temperature of at least 25° C. to a second temperature of 7° C. or lower, and after the reducing maintaining the aqueous salt solution at a temperature of 7° C. or lower for at least 15 minutes;

the water to the dissolving is provided at a temperature of at least 30° C.;

the method comprises after the precipitating and before the preparing the feed of the aqueous electrolyte solution, separating aqueous liquid from precipitated sodium sulfate decahydrate; and the method comprises after the separating and prior to the preparing the feed of the aqueous electrolyte solution, washing the sodium sulfate decahydrate with aqueous wash liquid to remove residual contaminants.

23. A method according to claim 22, comprising:

preparing a carbonate-containing solution, comprising contacting at least a portion of the sodium hydroxide in solution with carbon dioxide to form dissolved sodium-containing carbonate material, wherein the sodium-containing carbonate material is selected from the group consisting of sodium carbonate, sodium bicarbonate and combinations thereof; and preparing regenerated sodium-containing sulfate material, comprising contacting a calcium sulfate reagent with at least a portion of the carbonate-containing solution comprising the dissolved sodium-containing carbonate material, to precipitate calcium carbonate and form dissolved sodium-containing sulfate material.

24. A method according to claim 23, comprising preparing the feed solids of sodium sulfate decahydrate, the preparing feed solids of sodium sulfate decahydrate comprising precipitating sodium sulfate decahydrate from an aqueous salt solution wherein a feed of the aqueous salt solution to the preparing the feed solids comprises at least a portion of the regenerated sodium-containing sulfate material.

* * * * *